US012643290B2

(12) United States Patent
Buermeyer et al.

(10) Patent No.: US 12,643,290 B2
(45) Date of Patent: Jun. 2, 2026

(54) POWDER HOPPER FOR ADDITIVE MANUFACTURING SYSTEM

(71) Applicant: VulcanForms Inc., Devens, MA (US)

(72) Inventors: Lucas Buermeyer, Ayer, MA (US); Andrew McDermot, Amesbury, MA (US); Stephen Elliot Wei, Medford, MA (US); William Curtis Stone, Tewksbury, MA (US)

(73) Assignee: VulcanForms Inc., Devens, MA (US)

( * ) Notice: Subject to any disclaimer, the term of this patent is extended or adjusted under 35 U.S.C. 154(b) by 40 days.

(21) Appl. No.: 18/524,150

(22) Filed: Nov. 30, 2023

(65) Prior Publication Data

US 2024/0181704 A1 Jun. 6, 2024

Related U.S. Application Data

(60) Provisional application No. 63/429,249, filed on Dec. 1, 2022.

(51) Int. Cl.
| | |
|---|---|
| *B22F 10/28* | (2021.01) |
| *B29C 64/153* | (2017.01) |
| *B29C 64/255* | (2017.01) |
| *B29C 64/329* | (2017.01) |

(52) U.S. Cl.
CPC .......... *B29C 64/329* (2017.08); *B29C 64/153* (2017.08); *B29C 64/255* (2017.08)

(58) Field of Classification Search
CPC ..... B29C 64/255; B29C 64/329; B22F 10/28; B22F 12/52
See application file for complete search history.

(56) References Cited

U.S. PATENT DOCUMENTS

| | | | |
|---|---|---|---|
| 9,956,612 | B1 | 5/2018 | Redding et al. |
| 10,022,795 | B1 | 7/2018 | Redding et al. |
| 2014/0000332 | A1 | 1/2014 | Wilson et al. |
| 2016/0158889 | A1 | 6/2016 | Carter et al. |
| 2016/0368050 | A1 | 12/2016 | Morris et al. |
| 2017/0021455 | A1 | 1/2017 | Dallarosa et al. |
| 2017/0056975 | A1 | 3/2017 | Carter et al. |
| 2018/0200792 | A1 | 7/2018 | Redding et al. |

(Continued)

FOREIGN PATENT DOCUMENTS

| | | |
|---|---|---|
| EP | 3 521 028 A1 | 8/2019 |
| WO | WO 2022/086331 A1 | 4/2022 |
| WO | WO 2025/006255 A2 | 1/2025 |

OTHER PUBLICATIONS

International Search Report and Written Opinion mailed Mar. 25, 2024 in connection with International Application No. PCT/US2023/081722.

*Primary Examiner* — Paul J Gray

(74) *Attorney, Agent, or Firm* — Wolf, Greenfield & Sacks, P.C.

(57) ABSTRACT

A hopper for dispensing powder material for an additive manufacturing system includes a gate that is movable along a first direction to open and close a discharge slot and which is pivotable about a pivot axis transverse to the first direction. The first direction can be a horizontal direction and the pivot axis can be parallel to a vertical direction. The gate can have a portion that contacts the hopper, e.g., at a surface including the discharge slot, and is elastically deformed with movement from the open to the closed position.

29 Claims, 21 Drawing Sheets

(56)          References Cited

U.S. PATENT DOCUMENTS

| | | | |
|---|---|---|---|
| 2018/0207722 A1 | 7/2018 | Feldmann et al. | |
| 2018/0236549 A1 | 8/2018 | Spears et al. | |
| 2019/0118263 A1 | 4/2019 | Buller et al. | |
| 2019/0143406 A1 | 5/2019 | Carter et al. | |
| 2019/0299286 A1 | 10/2019 | Feldmann et al. | |
| 2020/0039000 A1 | 2/2020 | Sweetland | |
| 2020/0079012 A1 | 3/2020 | Pawliczek et al. | |
| 2020/0108465 A1 | 4/2020 | Sweetland | |
| 2020/0230745 A1 | 7/2020 | Komsta et al. | |
| 2020/0376761 A1 | 12/2020 | Sweetland | |
| 2021/0254904 A1* | 8/2021 | Bhaskar | F28F 7/02 |
| 2021/0339318 A1 | 11/2021 | Dunbar et al. | |
| 2022/0009030 A1 | 1/2022 | Dadelszen et al. | |
| 2022/0097144 A1* | 3/2022 | Liu | B23K 26/38 |
| 2023/0056367 A1 | 2/2023 | Leonardo et al. | |
| 2023/0398565 A1* | 12/2023 | Hendriks | B05C 5/0262 |

* cited by examiner

POWDER HOPPER FOR ADDITIVE MANUFACTURING SYSTEM

RELATED APPLICATIONS

This application claims priority under 35 U.S.C. § 119(e) to U.S. Provisional Application No. 63/429,249, filed Dec. 1, 2022, the content of which is incorporated by reference in its entirety for all purposes.

FIELD

Aspects of the disclosure relate to a powder hopper for an additive manufacturing system.

BACKGROUND OF INVENTION

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, the build surface may be indexed downwardly by a distance corresponding to a thickness of a layer, precursor material may be deposited and then selected portions of the layer fused. This process may be repeated layer-by-layer to fuse many two-dimensional layers into a three-dimensional object.

SUMMARY OF INVENTION

As noted above, multiple layers of precursor material must be provided for each layer fusion process and such layers are ideally put down in a consistent and accurate way. For example, the layers are ideally deposited in a uniform thickness across an entire build surface and without waste of precursor material. To do so, one or more powder hoppers are employed to deposit precursor material either in a single location or at one or more locations relative to a build surface. Accurate depositing of desired volumes of precursor material from a hopper can be important, e.g., to ensure the needed amount of material is deposited, but not more, and the hopper must be able to do so with minimal failure or error.

The inventors have discovered that some hopper arrangements may suffer from certain operating deficiencies, such as an inability to close in an accurate and timely way and/or undesired failure of hopper components. Inventive aspects of the disclosure provide systems and methods for hopper configuration and operation that avoid some of these and potentially other problems.

In some embodiments, a powder hopper for dispensing a powder material for an additive manufacturing system includes a hopper body defining a space to hold the powder material and a discharge slot from which the powder material is dispensable. The powder hopper may include a gate that is moveable relative to the hopper body along a first direction to open and close the discharge slot. For example, gate may be movable relative to the hopper body along a horizontal direction to open and close the discharge slot. The gate may be pivotable relative to the hopper body about a pivot axis that is transverse to the first direction, e.g., the gate may be pivotable about a vertical axis relative to the hopper body. By arranging the gate to be pivotable about a pivot axis that is transverse to the gate movement direction for opening and closing the discharge slot, the hopper may be made less likely to experience damage or other difficulties during opening and closing. For example, a pair of actuators used to move a hopper gate may not necessarily move in perfect alignment and/or at the same time, or if one actuator fails the gate will be moved by only one actuator. Differences in actuator movement can subject the gate to potentially damaging forces, e.g., torque on the gate or its connection to an actuator as one actuator moves one portion of the gate while the other actuator remains stationary. However, by providing a coupling that permits the gate to pivot about an axis that is perpendicular or otherwise transverse to the direction in which the hopper moves to open and close the discharge slot, variations in actuator movement amount and/or timing can be accommodated. As an example, the hopper may be configured to dispense the powder material from the discharge slot in a vertical direction, e.g., parallel to a local gravitational field, and the gate may be moved by a pair of actuators in a horizontal direction to open and close the gate. One or more couplings, e.g., incorporated into an actuator, the gate and/or a connection between an actuator and the gate, may permit the gate to pivot about the vertical direction, e.g., if the actuators do not move the gate at a same time and/or rate. As a result, variations in movement of the actuators can be accommodated by pivoting movement at one or more couplings.

In some embodiments, first and second actuators may be engaged at first and second locations on a gate that are spaced apart and may be configured to move the gate along the first direction. For example, the hopper gate may include first and second ends, and first and second actuators may be coupled between the hopper and the first and second ends, respectively, of the gate. The first and second actuators may be configured to move the first and second ends of the gate, respectively, along the first direction. For example, the first and second actuators may move the gate at its respective first and second ends along a horizontal direction to close and open the gate. In some cases, the first and second actuators may be configured to move respective portions of the gate relative to each other to pivot the gate about the pivot axis, e.g., which may be along a vertical direction. One or more couplings may be provided so that the gate may pivot about the pivot axis, e.g., in response to different movement amounts, directions and/or timing of the actuators.

In some embodiments, the gate may include an upper portion coupled to one or more actuators configured to move the gate in the first direction and a lower portion attached to the upper portion and configured to open and close the discharge slot with movement of the gate between the open and closed positions. For example, the upper and lower portions may form an L-shape, with the upper portion arranged generally vertically and the lower portion arranged generally horizontally. The upper portion of the gate may include a coupling, such as a living hinge, that defines a pivot axis about which the gate may be pivotable. For example, a part of the upper portion between first and second actuators may be configured to flex or bend in response to variations in movement of the actuators. In some embodiments, a coupling may be provided between first and/or second actuators and the gate or at part of one of the actuators and may be configured to permit rotation of a portion of the gate relative to the first and/or second actuator about the pivot axis.

In some embodiments, a hopper may include a gate that is movable relative to a hopper body along a first direction between open and closed positions to open and close a discharge slot. The gate may have a portion that is deformed elastically when the gate is at the closed position. For example, a portion of the gate may be configured to contact a bottom surface of the hopper body where the discharge slot is located and may elastically deform downwardly with contact with the bottom surface. The elastic deformation of the gate portion may help resiliently bias the gate into contact with the hopper body, e.g., in areas near the discharge slot, which may aid in ensuring that the discharge slot is closed to powder exit when the gate is closed. The gate may be out of contact with the hopper the open position, e.g., allowing powder material to exit the discharge slot. The bottom surface of the hopper body, e.g., the surface at which the discharge slot is located, may be configured to slope downwardly and away from the gate with the gate in the open position. As such, if the gate is moved horizontally relative to the hopper body, a leading end of the gate may contact the sloped surface and be deflected downwardly. Thus, the gate may be configured such that a leading end of the gate contacts the surface of the hopper body where the discharge slot is located and may be deformed elastically when the gate moves from the open position to the closed position. The hopper may include a guide configured to receive a leading end of the gate when the gate is in the closed position. For example, the gate in the closed position may have a first side (e.g., an upper side) that contacts the surface of the hopper at which the discharge slot is located, and may have a second side opposite the first side (e.g., a lower side) that contacts the guide, e.g., to help hold the gate portion in contact with the hopper body.

In some embodiments, a method for additive manufacturing comprises holding powder material within a hopper body, moving a gate relative to the hopper body along a first direction, pivoting the gate about a pivot axis that is transverse to the first direction, and dispensing the powder material from the hopper body.

In some further embodiments, a method for additive manufacturing comprises holding powder material in a hopper body, dispensing the powder material through a discharge slot, and moving a gate relative to the hopper body along a first direction between open and closed positions to open and close the discharge slot, respectively. The method further comprises contacting a portion of the gate with the hopper body, and elastically deforming the portion of the gate in the closed position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

In the drawings, each identical or nearly identical component that is illustrated in various figures may be represented by a like numeral. For purposes of clarity, not every component may be labeled in every drawing. In the drawings.

DETAILED DESCRIPTION

Figure 1:
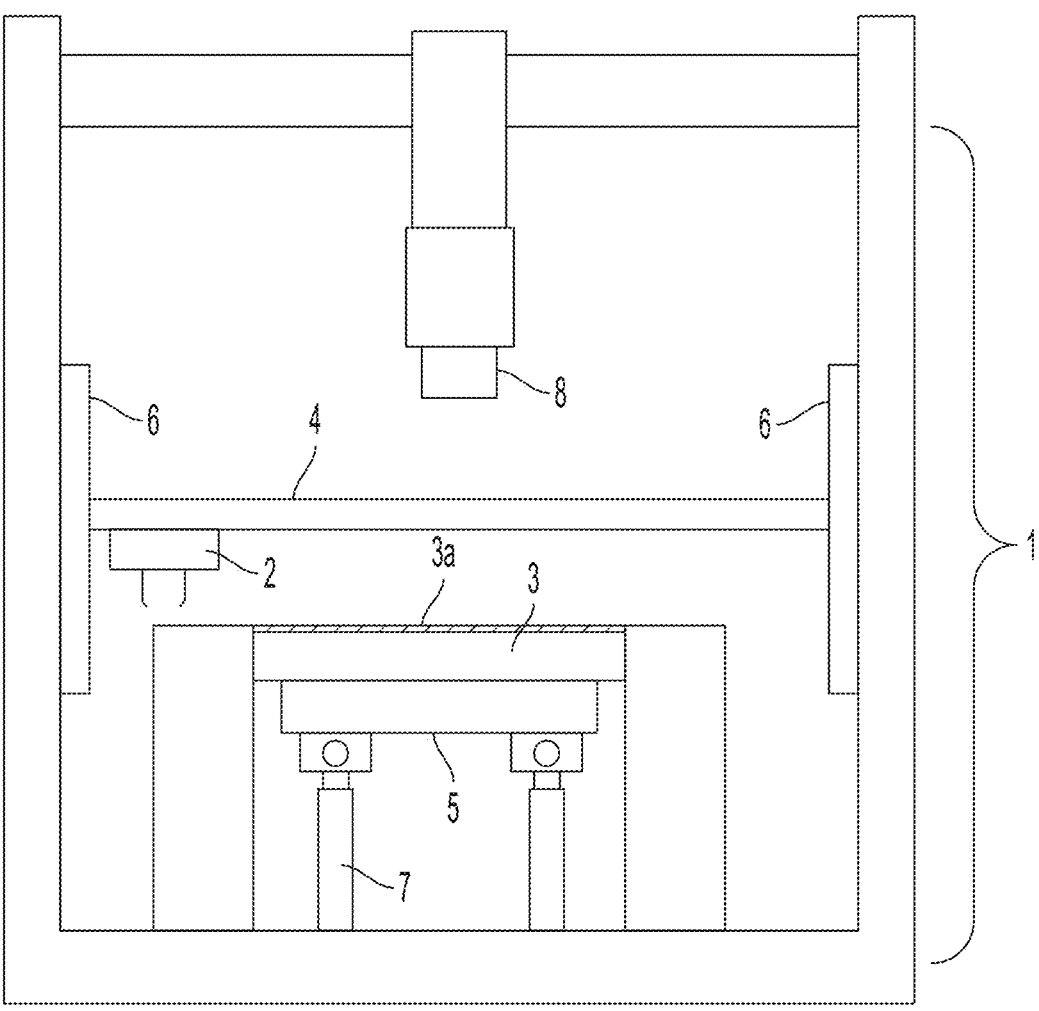
FIG. 1 is a schematic representation of an additive manufacturing system.

It should be understood that aspects of the invention are described herein with reference to the figures, which show illustrative embodiments. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

With the advancement and scaling of additive manufacturing came increasing demands on all portions of an additive manufacturing system. For example, the increased size of some build surfaces required many systems to use multiple smaller powder hoppers for large scale additive manufacturing. However, multiple powder hoppers deposited discrete piles of powder material, which led to the issue of uneven powder distribution as it was difficult to smooth out multiple piles of powder. The powder hopper also had to be farther away from the powder recoater and/or build surface, and the scraper blade used to smooth out the powder material had to be at an angle to its direction of travel across the build surface to achieve an even powder layer. Furthermore, powder hoppers had short lifetimes and were not designed to be repairable, causing the entire hopper system to be replaced whenever a part broke, which was both inefficient and costly.

Many factors could lead to a powder hopper needing to be completely replaced. For example, the powder hopper gate was often opened using two actuators, one on each side of the hopper gate. The movement of the actuators was meant to be synchronous, but on occasion the actuators would misfire or otherwise move in an asynchronous way, due to factors such as delayed signals or clogged actuators due to powder contamination. The shear force applied onto the hopper gate when only one actuator would move often deformed the gate to a degree or broke parts of the gate so as to make the gate no longer usable, causing the power hopper to have a short lifetime. A hopper gate was often manufactured with a high degree of precision, due to the need for the hopper gate to closely and accurately cover the discharge slot to prevent powder from exiting while the gate is in a closed position. Any deformation in the gate or failure of gate components would require the powder hopper to be replaced, and the larger the additive manufacturing system, the more time-consuming and costly the replacement. Thus, the inventors have recognized a need for a powder hopper that both adapts for possible modes of failure while remaining durable and providing accurate opening and closing of a hopper discharge slot.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material, which may also be referred to as powder material herein, deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

FIG. 1 depicts one embodiment of an additive manufacturing system 1 that incorporates one or more inventive features. In some embodiments, the system 1 includes a build plate 3 mounted on a base 5, which is in turn mounted on one or more vertical supports 7. The one or more vertical supports 7 can include any appropriate number of supports configured to support the build plate 3, and the corresponding build surface, at a desired position and/or orientation. For example, the supports 7 may include one or more actuators configured to control a vertical position and/or orientation of the build plate 3.

In some embodiments, the additive manufacturing system may also include an optics assembly 8 that is supported vertically above and oriented towards the build plate 3. The optics assembly may be optically coupled to one or more laser energy sources, not depicted, to direct laser energy in the form or one or more laser energy pixels onto the build surface of the build plate 3. To facilitate movement of the laser energy pixels across the build surface, the optics assembly may be configured to move in one, two, or any number of directions in a plane parallel to the build surface of the build plate. To provide this functionality, the optics assembly may be mounted on a gantry, or other actuated structure, that allows the optics unit to be scanned in a plane parallel to the build surface of the build plate.

The laser energy may be used to fuse precursor material 3a, such as a powdered metal material, in selected areas on the build surface to create a desired shape of fused material on the build surface. The additive manufacturing system 1 may include a powder deposition system configured to deposit and spread powdered precursor material 3a onto the build surface of the build plate 3. In some cases, the powder deposition system can include a hopper 2, e.g., mounted on a horizontal motion stage 4 that allows the hopper 2 to be moved across either a portion, or entire, surface of the build plate 3. As the hopper 2 traverses the build surface of the build plate 3, it may deposit a precursor material 3a, such as a powder, onto the build plate 3 and a powder recoater may smooth the surface of the precursor material 3a to provide a layer of precursor material with a predetermined thickness on top of the underlying volume of fused and/or unfused precursor material deposited during prior formation steps. In some cases, the hopper 2 may be mounted on a vertical motion stage 6 that can index or otherwise move the hopper 2 vertically, e.g., for each layer of precursor material deposited on the build surface.

However, movement of the hopper 2 is not required and in some embodiments the hopper 2 may be fixed in place and may deposit precursor material in a single or multiple discrete locations. Subsequently, the precursor material may be spread across the build surface by another movable element, e.g., by a recoater blade or other structure that spreads powder across the build surface. For a fixed hopper arrangement, in some embodiments the supports 7 of the build plate 3 may be used to index or otherwise move the build surface of the build plate 3 in a vertical downwards direction relative to a local direction of gravity for each layer of precursor material deposited on the build surface. In such an embodiment, the hopper 2 may remain vertically stationary for dispensing precursor material 3a, such as a precursor powder that is subsequently spread across the build surface. Alternately, the hopper 2 may be moved by the horizontal motion stage 4 to deposit precursor material onto the exposed build surface of the build plate 3 as the hopper is moved across the build plate each time the build plate is indexed downwards by the supports 7.

Figure 2A:
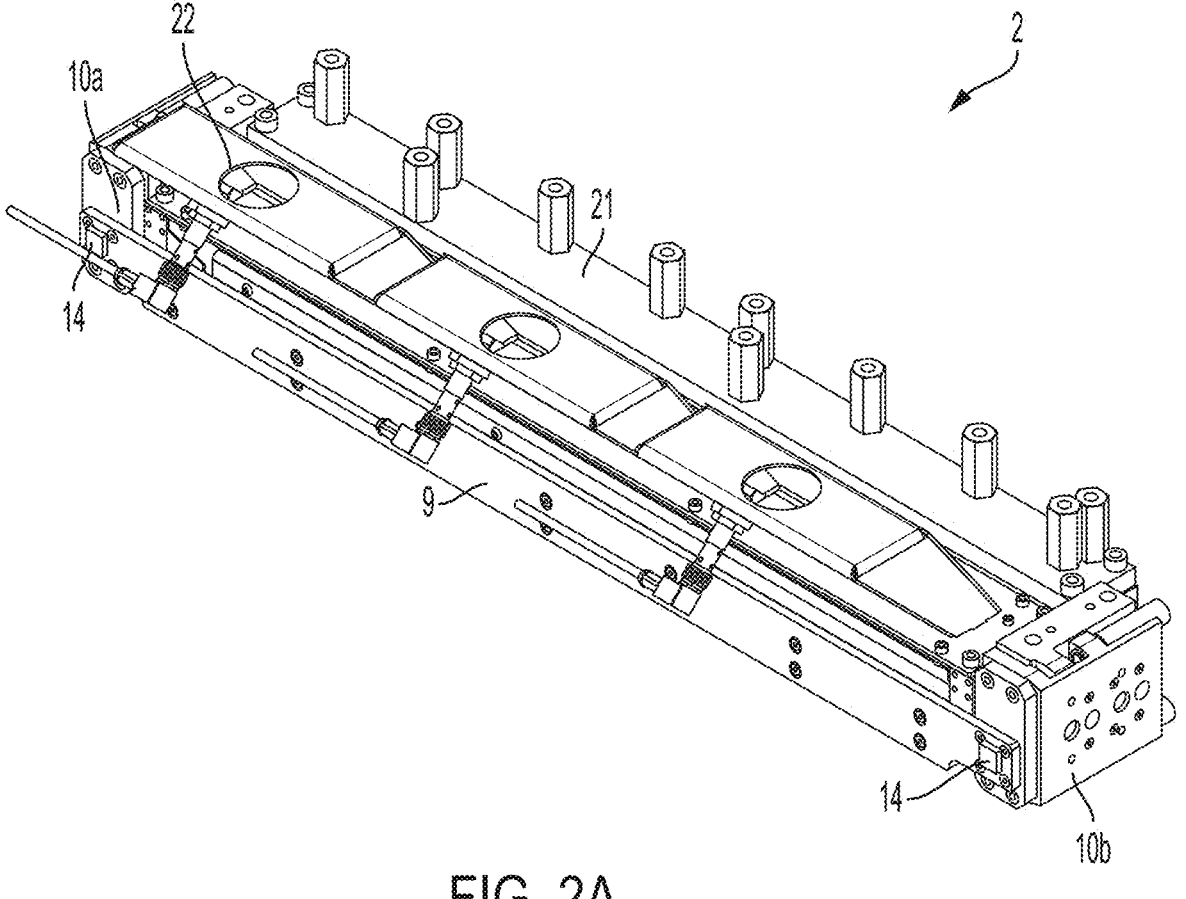
FIG. 2A is an upper, front right perspective view of a powder hopper with a hopper gate in a closed position, according to some embodiments.
Figure 2B:
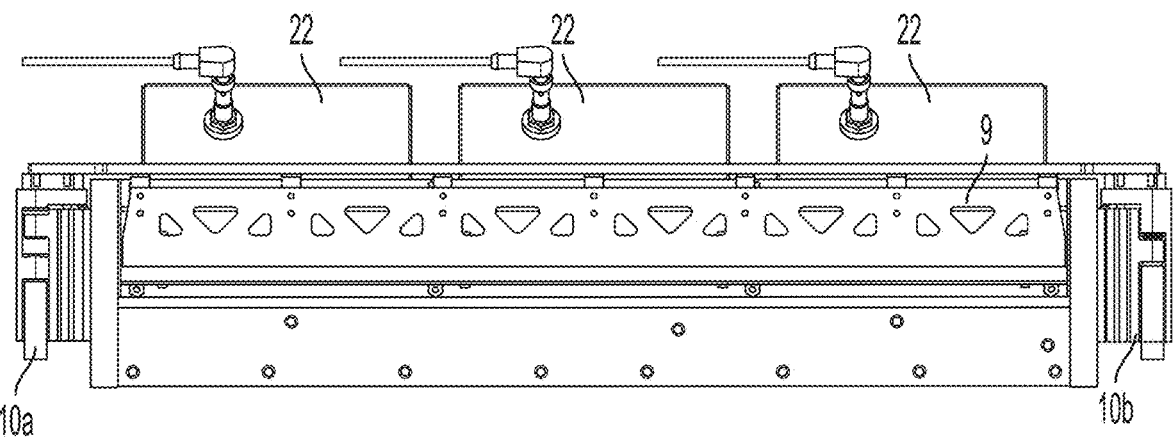
FIG. 2B is a bottom view of the powder hopper of FIG. 2A.
Figure 2C:
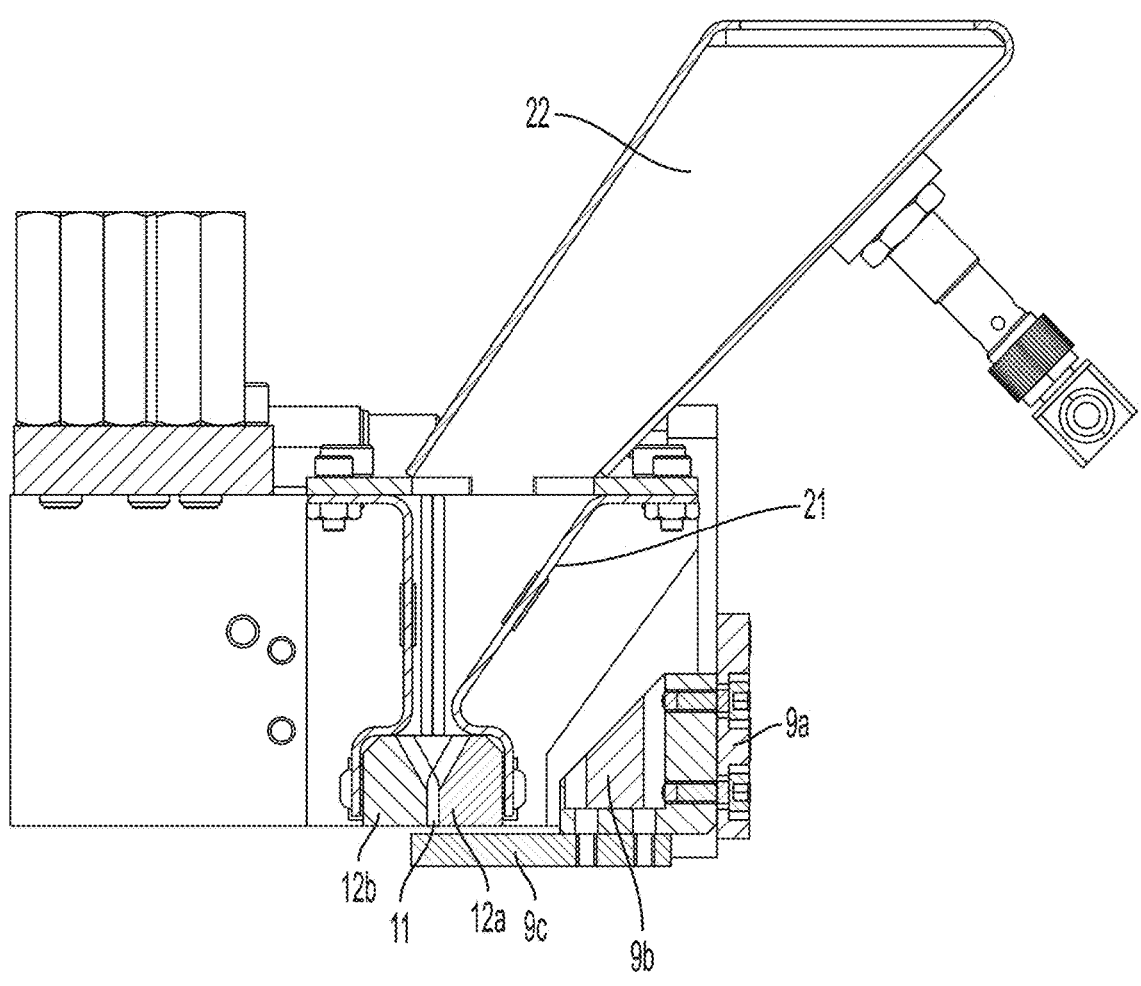
FIG. 2C is a left side cross-sectional view of the powder hopper of FIG. 2A.

In some embodiments, a hopper can be configured with a hopper body defining a space to hold a powder material and having a discharge slot from which the powder material can be dispensed. For example, FIGS. 2A-2C show an embodiment of a hopper 2 that includes a hopper body 21 configured to receive a powder material, e.g., via one or more chutes 22. The powder material can be held in the hopper body 21 and dispensed through a discharge slot 11, e.g., at a bottom of the hopper body 21. In some cases, the hopper 2 may be configured to dispense the powder from the discharge slot 11 in a vertical direction, e.g., downwardly from the hopper body 21. The hopper 2 can include a gate 9 that is movable relative to the hopper body 21 to open and close the discharge slot 11. For example, the gate 9 can be moved to the right in FIG. 2C to uncover the discharge slot 11 and allow powder material to fall from or otherwise exit the discharge slot 11. In some cases, the direction of dispensing of the powder from the discharge slot 11 (e.g., vertically downward) may be transverse to the direction of movement of the hopper gate 9 to open and close the discharge slot 11 (e.g., horizontally left to right). Thus, in some embodiments, the hopper 2 may dispense powder from the discharge slot 11 in a vertical direction and the hopper gate 9 may move in a horizontal direction to open and close the discharge slot 11. In some cases, the gate 9 may be out of contact with the hopper body 21 when in the open position. In some cases, the gate 9 need not contact the hopper body 21 in areas at or near the discharge slot 11 when in the closed position. Instead, and as shown in FIG. 2C, a lower portion 9c of the gate 9 may be spaced from front and rear lower surfaces 12a, 12b of the hopper body 21 near the discharge slot 11 and yet prevent powder from exiting the slot 11. A gap between the lower portion 9c and the hopper body 21 at the discharge slot 11 may be suitably small to prevent powder from exiting the slot 11. However, in some embodiments, the gate 9 may contact the hopper body 21 when in the closed position to occlude or cover the discharge slot 11. For example, portions of the lower portion 9c of the gate 9 can contact forward and/or rear surfaces 12a, 12b of the hopper body 21 when in the closed position to close the discharge slot 11.

Figure 3A:
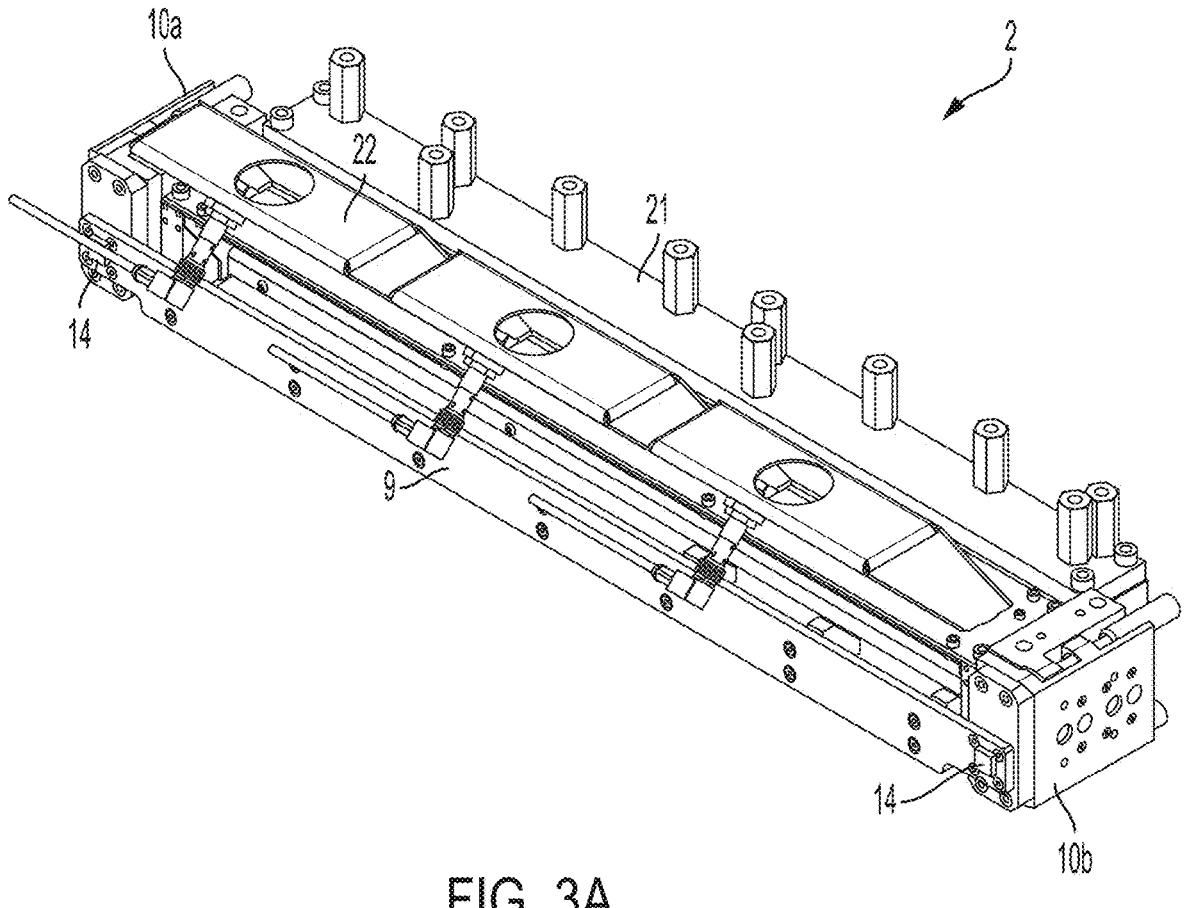
FIG. 3A is an upper, front right perspective view of the powder hopper of FIG. 2A with the gate in an open position.
Figure 3B:
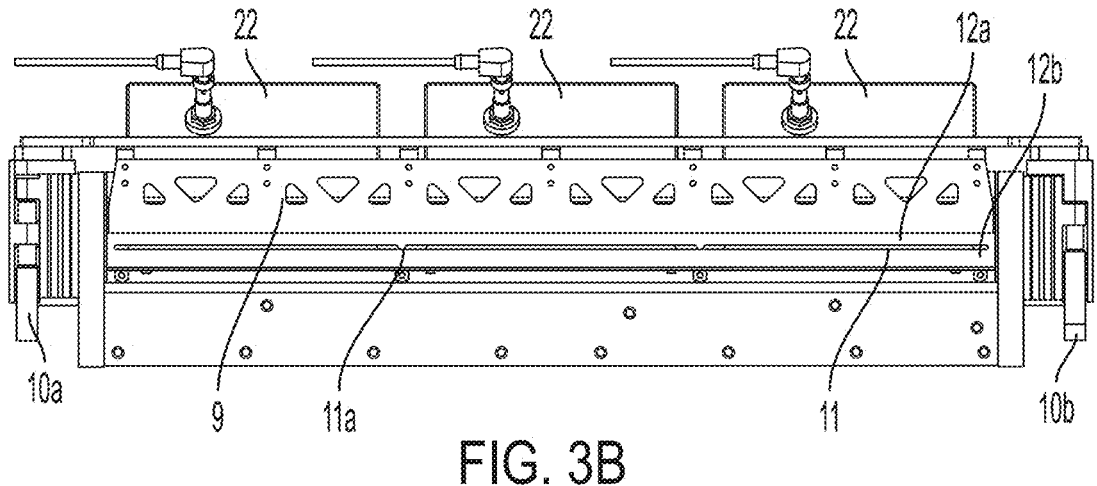
FIG. 3B is a bottom view of the powder hopper of FIG. 2A with the gate in the open position.
Figure 3C:
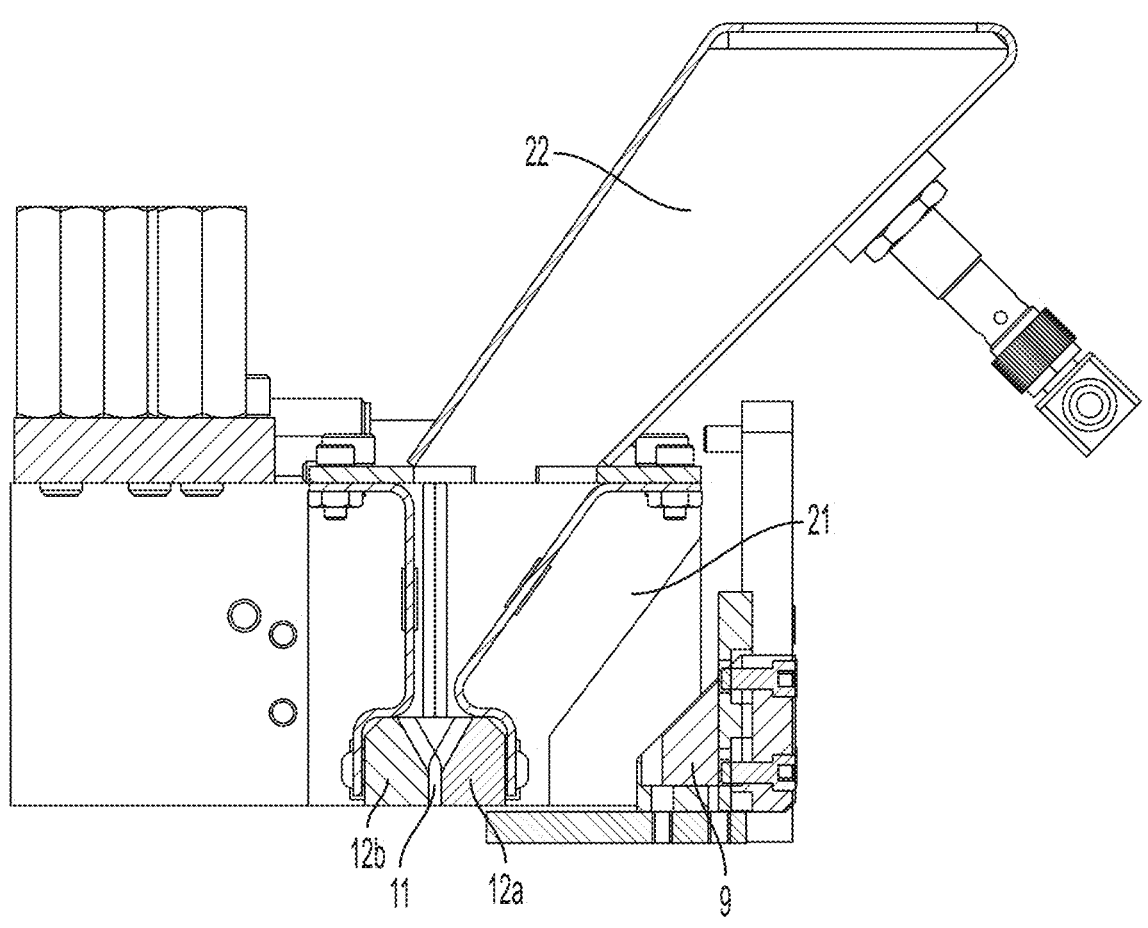
FIG. 3C is a left side cross-sectional view of the powder hopper of FIG. 2A with the gate in the open position.

The gate 9 can be moved by first and second actuators 10a, 10b that are coupled to the gate at respective first and second locations that are spaced apart. For example, the actuators 10a, 10b can be attached to respective first and second ends of the hopper body 21 and to respective first and second ends of the gate 9. Thus, the first and second actuators 10a, 10b can be coupled between the hopper body 21 and the first and second ends of the gate 9. In some embodiments, one or more couplings 14 may be provided between the gate 9 and each of the actuators 10a and 10b. The actuators 10a, 10b can be configured to move the gate 9 relative to the hopper body 21 between open and closed positions to open and close the discharge slot 11. For example, FIGS. 3A-3C show the gate 9 in the open position. Typically, the actuators 10a, 10b operate at a same time and same rate (e.g., in response to a same control signal) so that the first and second ends of the gate 9 move relative to the hopper body 21 at the same time and rate. However, in some embodiments, the actuators 10a, 10b may operate independently and/or at different timing and/or at different movement rates. Such different movement of the actuators 10 may be intentional or not, e.g., the actuators 10 may move at a different timing and/or movement rate due to various factors such as different control signal timing, different levels of friction or other mechanical interference with movement of the actuators 10, a failing actuator component, etc. When prior arrangements experienced different actuator movement, the actuators 10, gate 9 and/or fasteners used to connect the actuator and gate together experienced relatively high stress which frequently resulted in failure of one or more components.

Figure 4A:
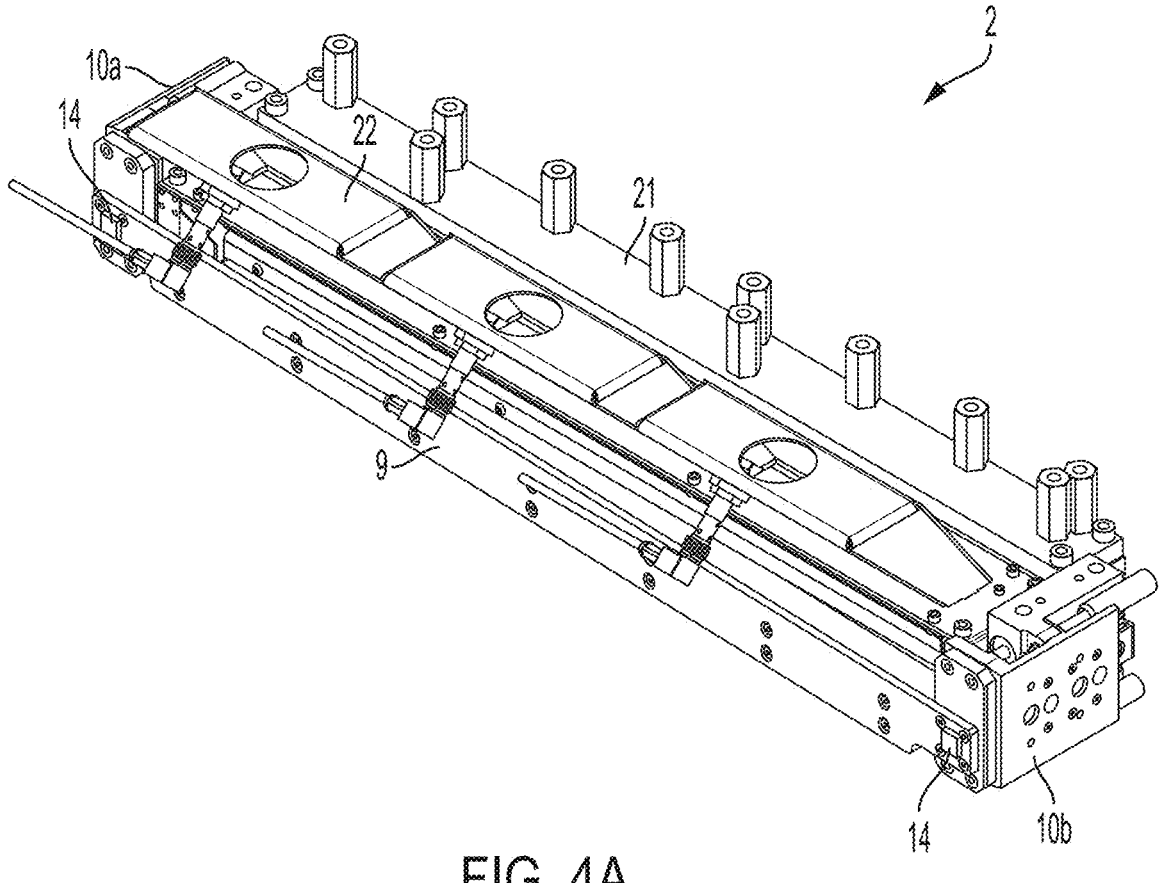
FIG. 4A is an upper, front right perspective view of the powder hopper of FIG. 2A with the gate in a partially open position, according to some embodiments.
Figure 4B:
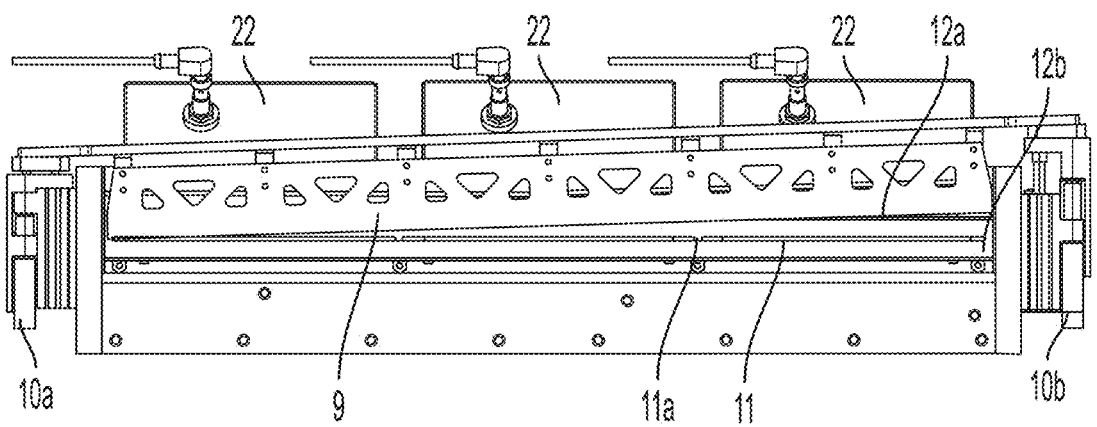
FIG. 4B is a bottom view of the powder hopper of FIG. 2A with the gate in the partially open position.
Figure 4C:
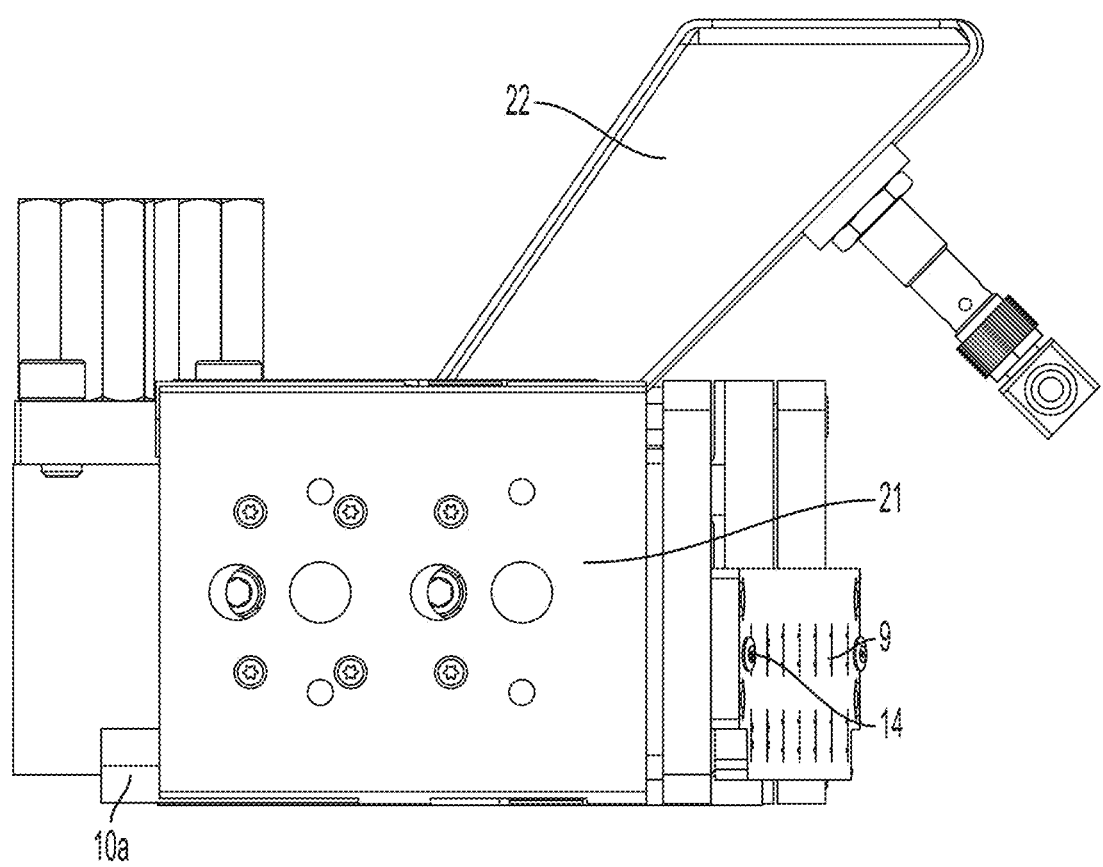
FIG. 4C is a left side view of the powder hopper of FIG. 2A with the gate in the partially open position.

In some embodiments, the gate 9 may be arranged so that the gate 9 can pivot about a pivot axis that is transverse to the direction that the gate 9 moves to open and close the discharge slot 11, e.g., transverse to the direction in which the actuators 10 move the gate 9. As a result, stress experienced by the actuators, gate and/or fasteners can be significantly reduced, particularly when the actuators move at different timings and/or rates. For example, FIGS. 4A-4C show an arrangement in which the second actuator 10b is extended or has moved the second end of the gate 9 to the open position but the first actuator 10a is retracted so the first end of the gate 9 is in the closed position. In this condition, the discharge slot 11 may be partially open and partially closed. The gate 9 may be intentionally moved in this way for various purposes, such as depositing more material at one end of the hopper 2 than at the other. On the other hand, the gate 9 may be unintentionally moved in this way, e.g., because of a failed actuator. In prior systems, movement of a gate like that shown in FIGS. 4A-4C would likely break one or more gate components because the gate was not configured to pivot in this way. However, the ability of the gate to pivot about an axis transverse to the movement direction of the gate can significantly reduce stresses on hopper components. In cases where the gate 9 is moved in a horizontal direction between open and closed positions, the gate 9 may pivot about a pivot axis that is transverse to the horizontal direction, e.g., the pivot axis may be parallel to a vertical axis along which powder is dispensed from the discharge slot 11. For example, in some embodiments, the direction of the movement of the hopper gate 9 is parallel to the plane of the bottom of the hopper body 21 and the pivot axis for the gate 9 is vertically oriented. However, the gate is not limited to moving in a horizontal direction and the pivot axis is not limited to being parallel to a vertical direction. Rather, the gate 9 may be moved in any suitable direction between open and closed positions and the gate 9 may be pivotable about a pivot axis that is oriented transverse to the direction of movement of the gate, e.g., the pivot axis may be at any angle of 90 degrees or less relative to the movement direction of the gate. In some situations, the pivot axis may be the Z axis, and may be perpendicular to the direction of movement of the hopper gate, which is in the XY plane.

Pivotal movement of the gate may be enabled in any suitable way, and the rotation illustrated in FIGS. 4A-C is just one possible embodiment of the pivoting motion around an axis transverse to the direction of movement of the gate. The first and second actuators, 10a and 10b, can be configured to move the first and second ends of the gate 9 relative to each other to pivot the gate 9 about a pivot axis. One possible method to provide the pivoting motion is through the application of suitable couplings 14 between the gate 9 and the actuators 10a, 10b with at least one degree of rotational freedom. In some cases, a coupling 14 may be made part of an actuator 10 and/or as part of the gate 9. The couplings 14 may comprise any type of revolute joint or flexure bearing, such as hinge or pivot joints. For example, the first and/or second ends of the gate 9 can be coupled to the actuators 10a, 10b using a hinge pin or joint and/or the gate 9 itself may incorporate a hinge or other pivotal coupling 14. In some embodiments, the gate 9 and/or a coupling 14 to one or more actuators 10 can include a living hinge, e.g., as shown in the embodiment of FIGS. 4A-4C. In some cases, the gate 9 may include a portion that can flex or bend elastically or otherwise to provide a living hinge. Any coupling 14 may be employed to permit a portion of the actuator, gate and/or coupling between the actuator and gate to pivot, e.g., such that any shear force or stress resulting from an uneven movement of the actuators is translated into rotational motion through the coupling and not applied onto the gate 9 or actuators 10. The couplings may permit a rotation of a portion of the gate 9 relative to the first or second actuator 10a, 10b about the pivot axis. The couplings 14 can increase the lifetime of the hopper by preventing the deformation of the hopper gate, actuators or fasteners or other coupling between the actuators and gate.

In some embodiments, the gate 9 may be moved by two actuators 10a and 10b, one on each side of the hopper body 21 as in FIGS. 2A-2C. In some embodiments, one or more actuators may be located between the sides or ends of the hopper body 21. Any configuration of actuators may be used to move the gate, including those with a coupling which allows for the gate to pivot around an axis transverse to the direction of movement of the gate between open and closed positions. The actuators 10 may be one of an electric motor, a solenoid, a hydraulic actuator, pneumatic actuator or other suitable drive. In some cases, the actuators 10 may also include a bearing to provide physical support for the gate in its movement between the open and closed positions as well as drive motion of the gate 9. For example, the actuators 10 may include a slide bearing, roller or ball bearing, etc. to support the gate 9 in its motion between the open and closed positions. Alternately, one or more bearings, guides or other components separate from the actuators 10 may be provided to provide physical support for the gate in its movement between the open and closed positions while the actuators simply provide the driving force. The bearing may be sealed or otherwise shielded, e.g., to resist powder material from interfering with movement of the bearing components. Between where the actuators 10 are coupled to the hopper body 21, there may be shock absorbing elements such as rubber disks to reduce the impact of the opening and closing of the gate 9 on the powder hopper.

In some embodiments, a gate includes an upper portion coupled to an actuator configured to move the gate in the first direction and a lower portion attached to the upper portion and configured to open and close the discharge slot with movement of the gate between the open and closed positions. One example of the hopper gate 9 shown in FIGS. 2A-4C is depicted in greater detail in FIGS. 5A-D. The hopper gate 9 shown in FIG. 5A-D includes three main parts: an upper portion 9a, a lower portion 9c, and brackets 9b connecting the lower portion 9c and upper portion 9a together. The upper portion 9a is coupled to the actuators 10, while the lower portion 9c opens and closes the discharge slot with the movement of the gate. In some embodiments, the brackets 9b and lower portion 9c may be made relatively stiff and inflexible, e.g., so that the lower portion 9c can be accurately moved between open and closed positions while maintaining a suitable gap or contact force with the bottom surface of the hopper body 21. Although the brackets 9b and lower portion 9c may not flex or elastically deform, these portions can avoid any shear stress or other force due to uneven movement of the actuators by a rotating or other suitable coupling between the actuators 10a, 10b and the upper portion 9a. In some embodiments, the upper portion

Figure 5A:
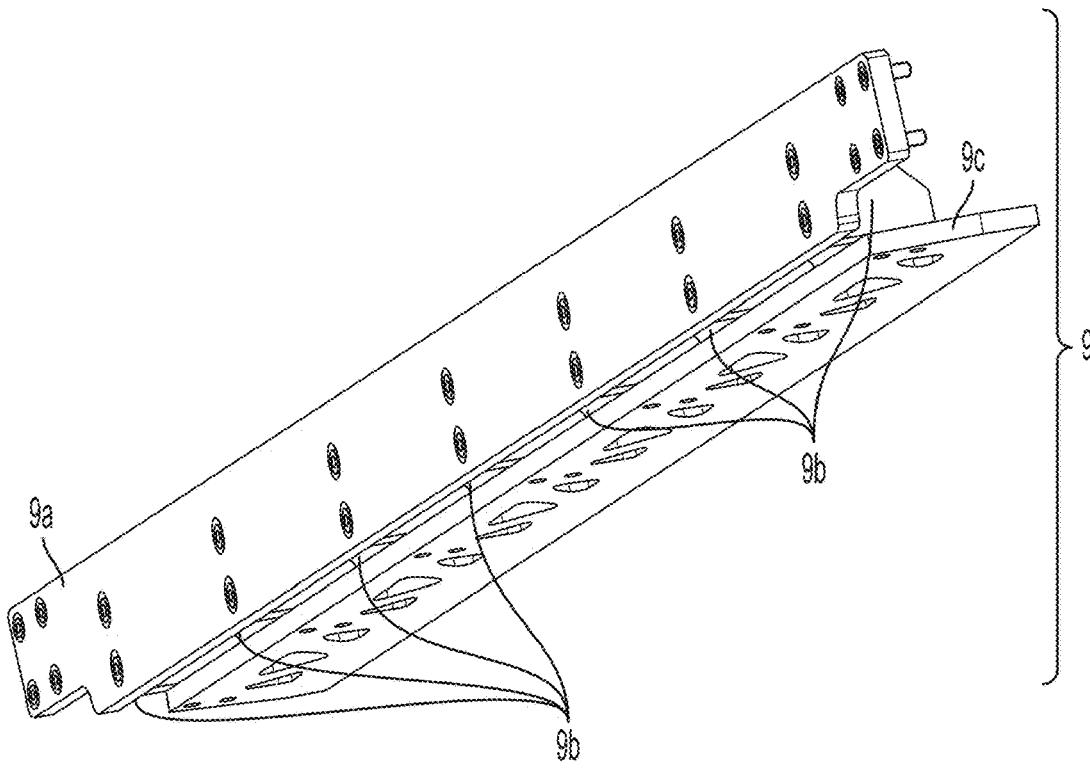
FIG. 5A is a lower, front right perspective view of the gate of the powder hopper of FIG. 2A.
Figure 5B:
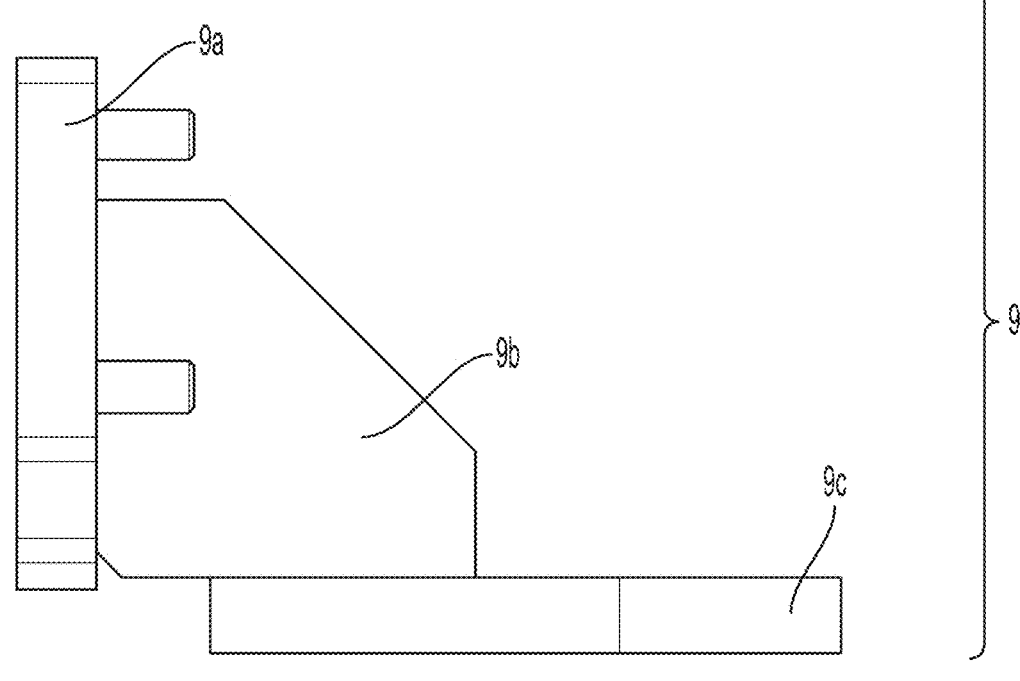
FIG. 5B is a right side view of the gate of the powder hopper of FIG. 2A.
Figure 5C:
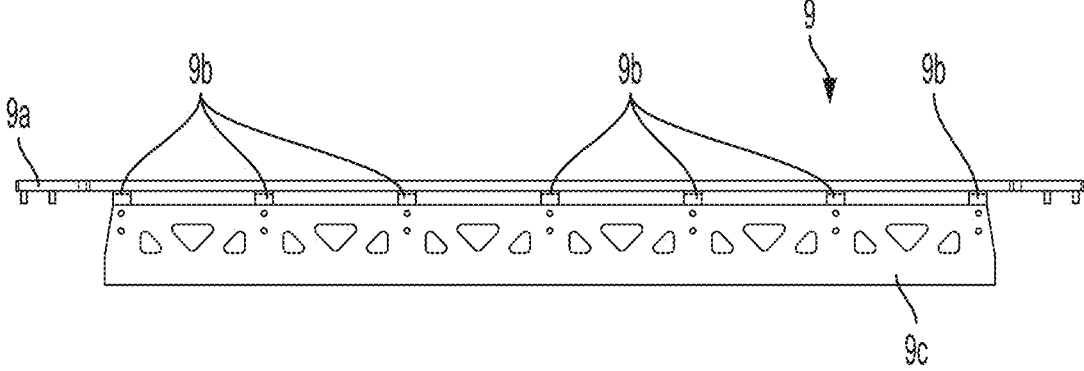
FIG. 5C is a bottom view of the gate of the powder hopper of FIG. 2A.
Figure 5D:
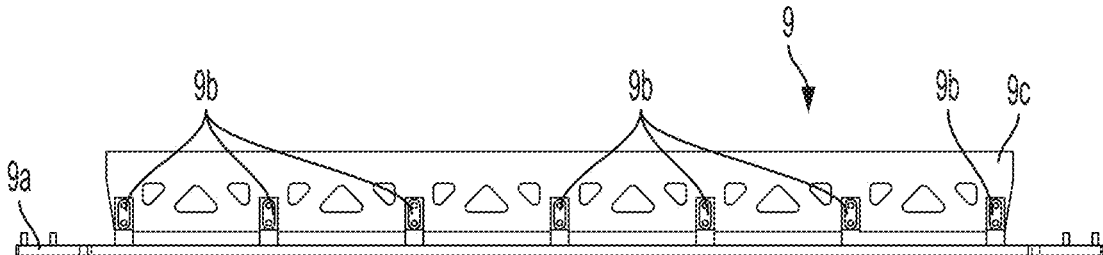
FIG. 5D is a top view of the gate of the powder hopper of FIG. 2A.

9a may incorporate one or more living hinges to provide for pivotal movement of the gate 9. For example, the upper portion 9a may include narrowed end portions that are reduced in height and/or thickness relative to more central parts of the upper portion 9a. These narrowed end portions may be capable of flexing with uneven movement of the actuators 10a, 10b, and thereby provide pivotal movement of the gate 9. Other suitable arrangements may be employed. Also, the gate 9 need not be made of three parts, but rather may be made as a single piece, or any other number of pieces. In addition, while the gate 9 in FIGS. 2A-6 is shown having an L-shape, this is not required. Instead, the gate 9 may include only the lower portion 9c, for example, which may be coupled to the actuators 10a, 10b, e.g., by way of one or more pivotal couplings 14. One or more portions of the gate 9 may have cutouts, e.g., as shown for the lower portion in FIGS. 5A-5D for the lower portion 9c, or may be solid, as long as the gate can maintain the functionality of blocking the discharge slot 11 in the closed position and unblocking the discharge slot in the open position. In FIG. 5C, the lower portion 9c includes cutouts, which maintain the functionality of the hopper gate while decreasing the weight of the gate in particular and of the hopper system overall.

Figure 6:
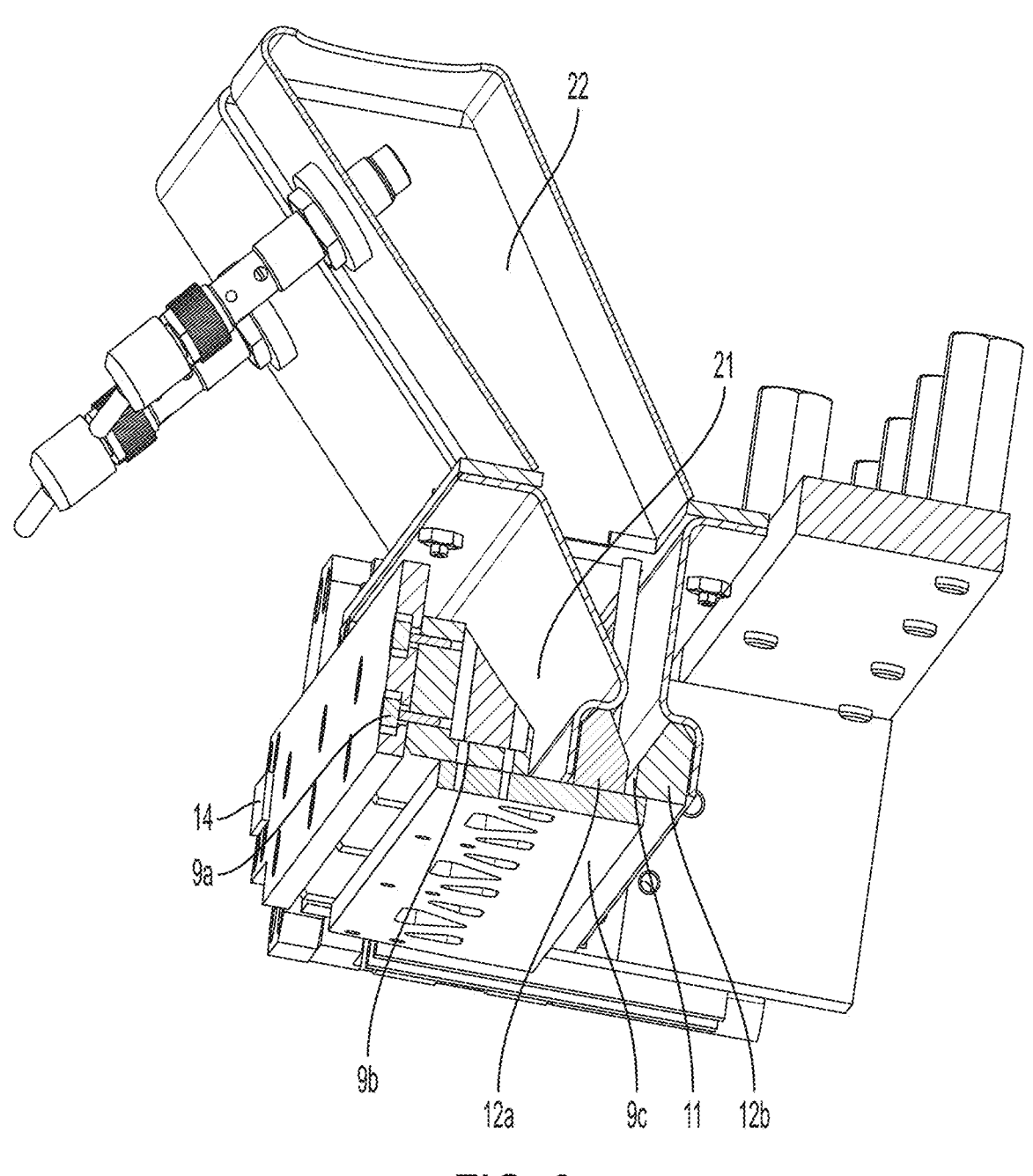
FIG. 6 is a lower, front right side cross-sectional perspective view of a powder hopper with the gate in the closed position, according to some embodiments.

In the embodiments of FIGS. 2A-2C, the gate 9 adequately covers the discharge slot 11 to prevent powder material from being dispensed in the closed position without contacting the bottom surface of the hopper body 21 at or near the discharge slot 11. However, in some cases, the gate may contact the bottom of the hopper body 21 near the discharge slot 11 when the gate 9 is in a closed position. For example, one embodiment is shown in FIG. 6, where the gate 9 contacts the forward and rear surfaces 12a, 12b of the hopper body 21 near the discharge slot 11 while in a closed position. The surfaces 12a, 12b of the discharge slot 11 may be flat and lie in a common plane, as shown in FIG. 2C, or the surfaces 12a, 12b may be angled, e.g., in relation to a direction of movement of the gate.

Figure 7A:
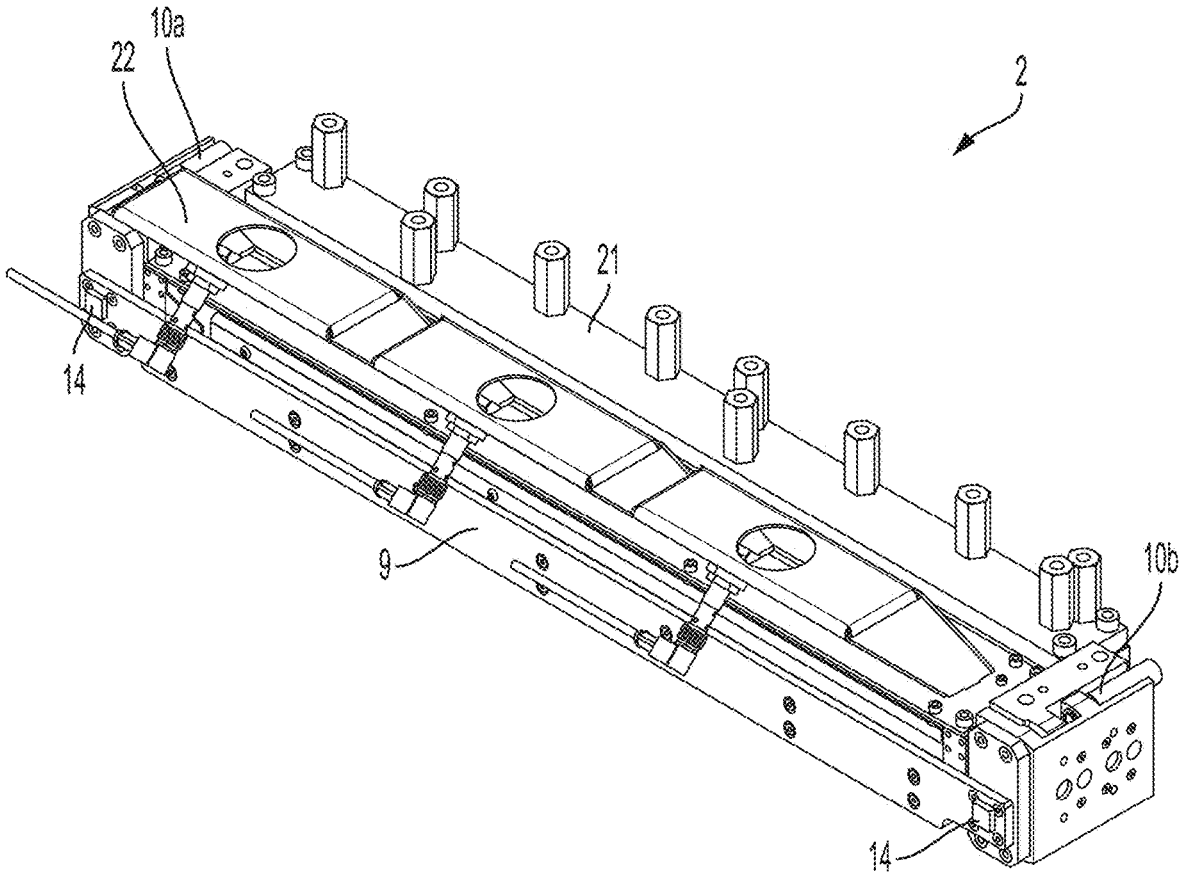
FIG. 7A is an upper, front right perspective view of a powder hopper with a gate having an elastically deformable portion in a closed position, according to some embodiments.
Figure 7B:
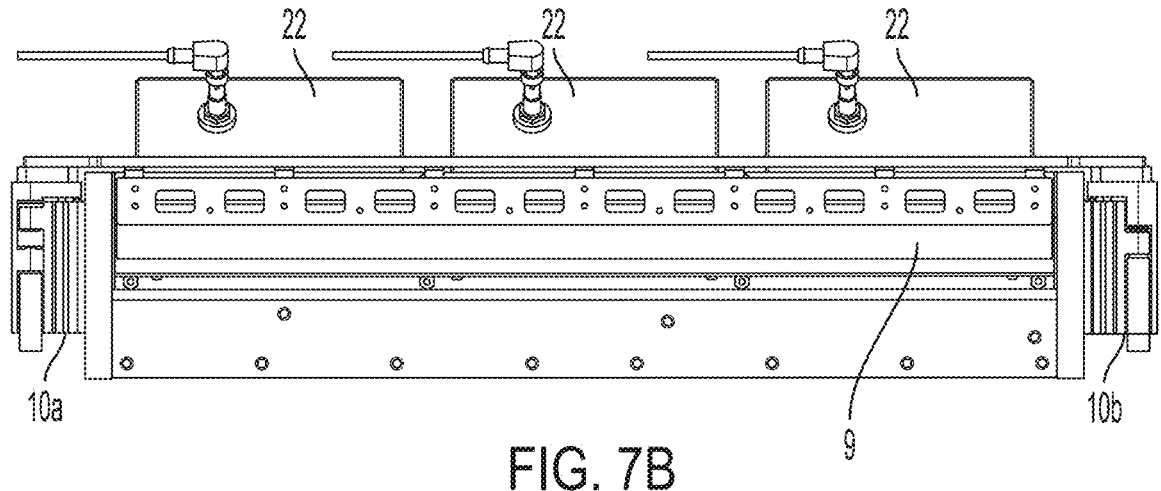
FIG. 7B is a bottom view of the powder hopper of FIG. 7A.
Figure 7C:
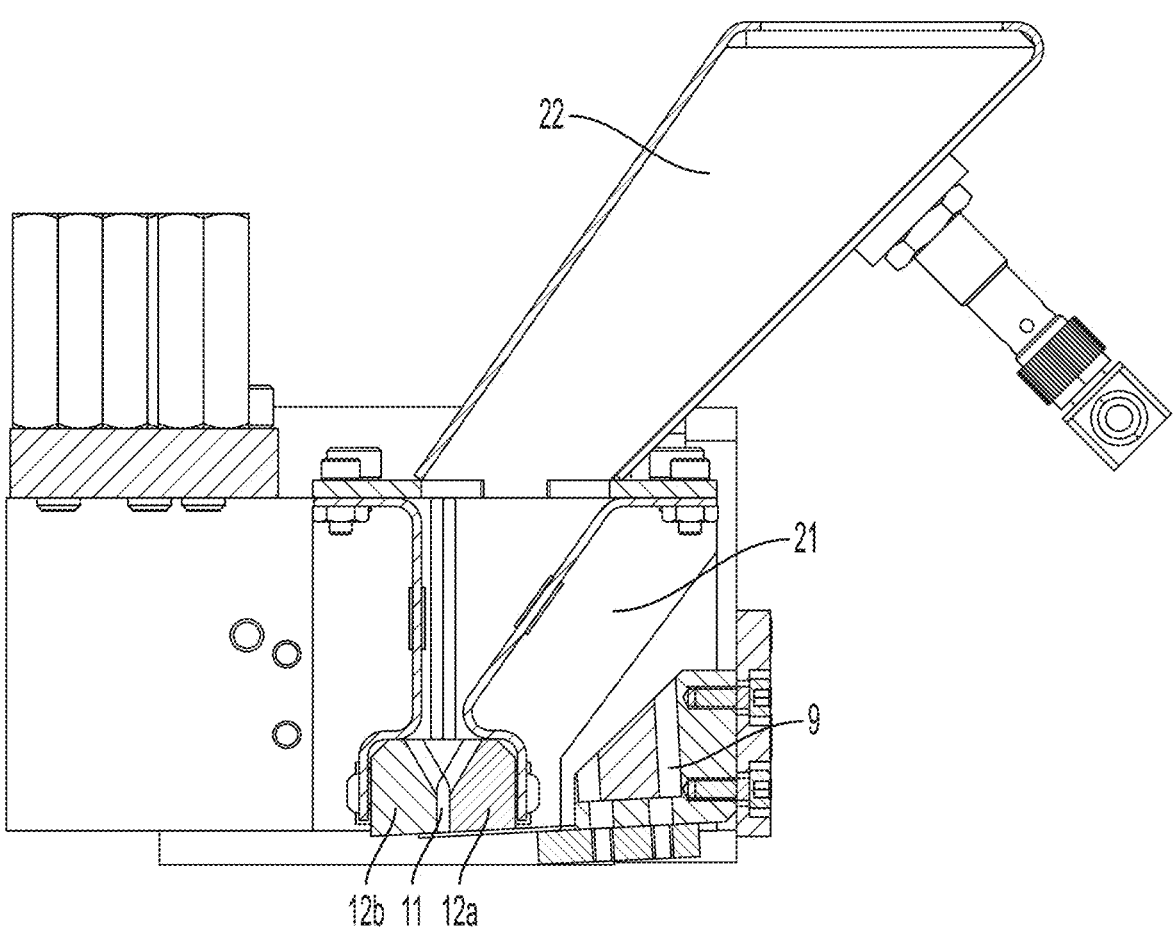
FIG. 7C is a left side cross-sectional view of the powder hopper of FIG. 7A.
Figure 8A:
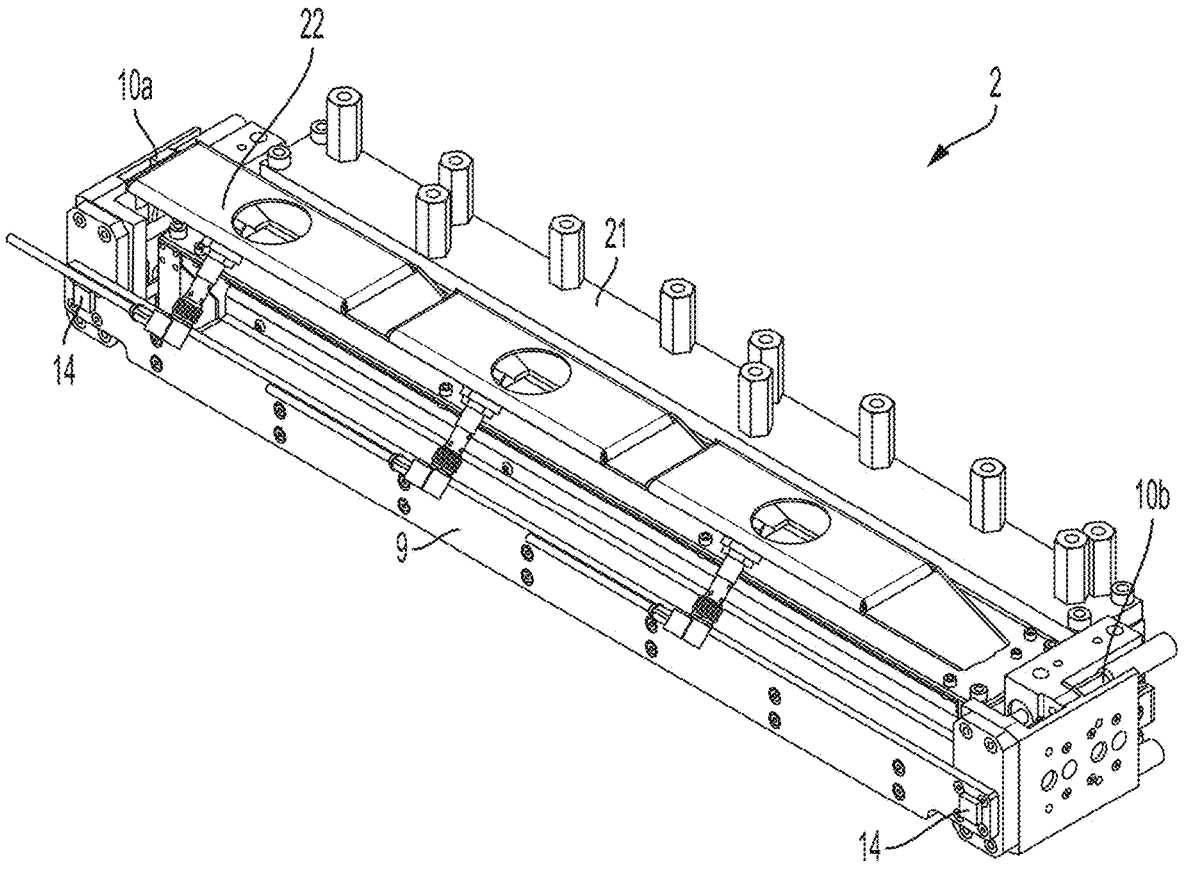
FIG. 8A is an upper, front right perspective view of the powder hopper of FIG. 7A with the gate in an open position.
Figure 8B:
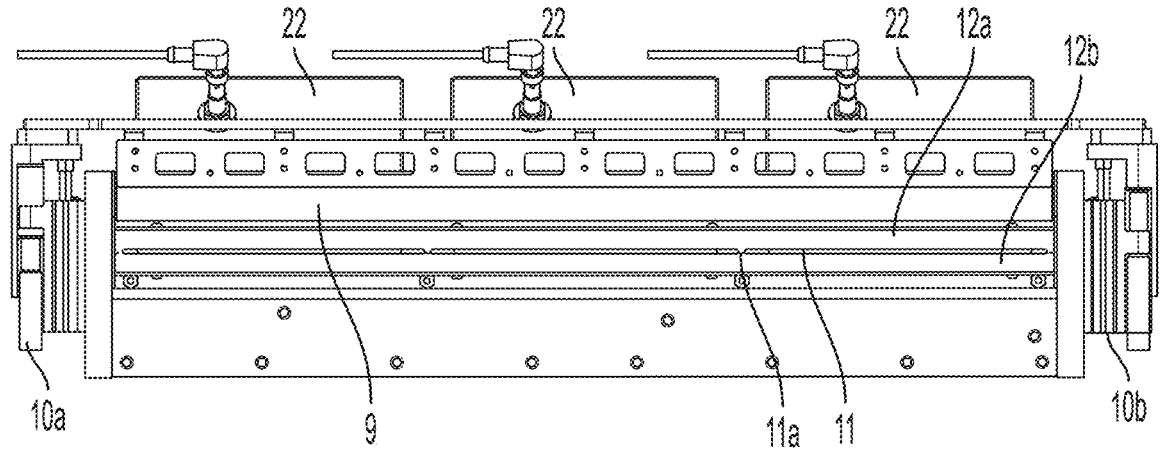
FIG. 8B is a bottom view of the powder hopper of FIG. 7A with the gate in the open position.
Figure 8C:
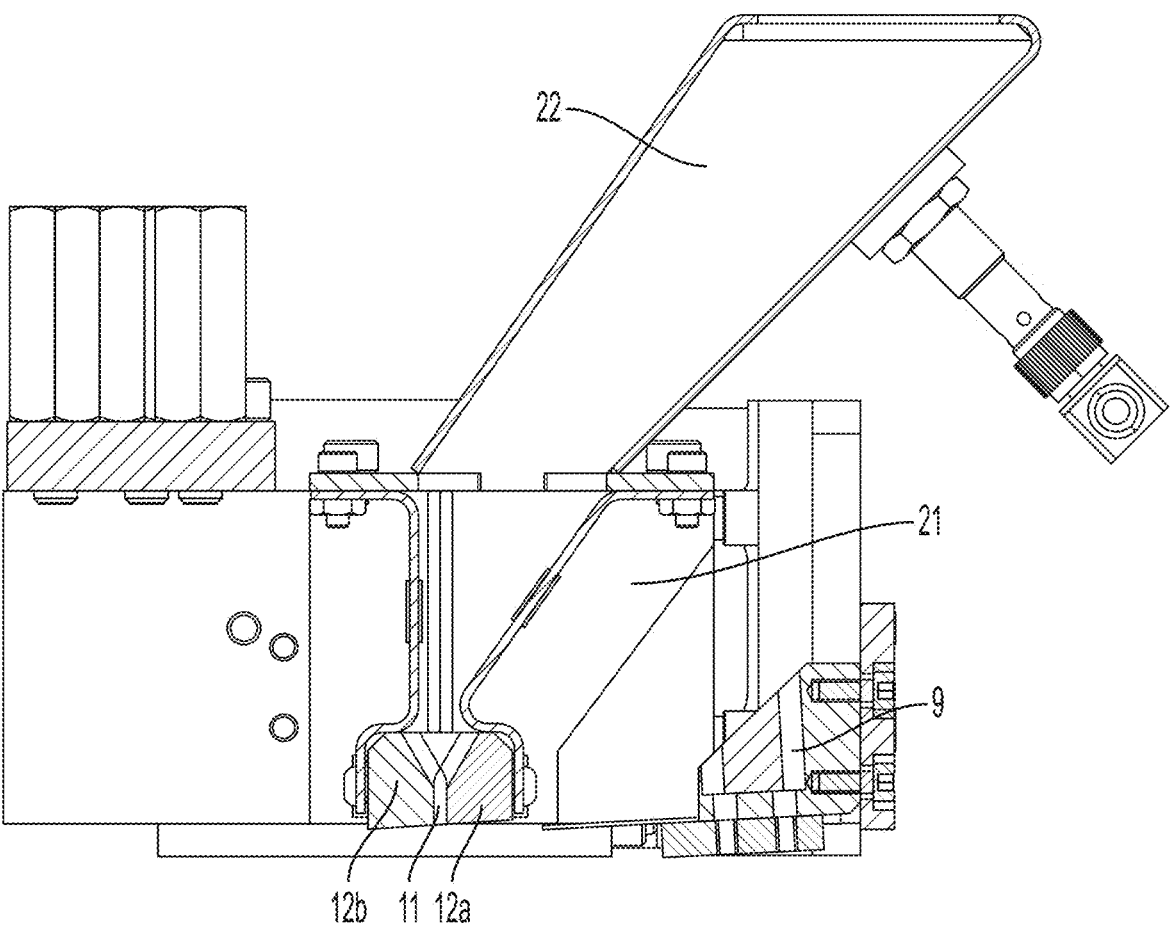
FIG. 8C is a left side cross-sectional view of the powder hopper of FIG. 7A with the gate in the open position.
Figure 9A:
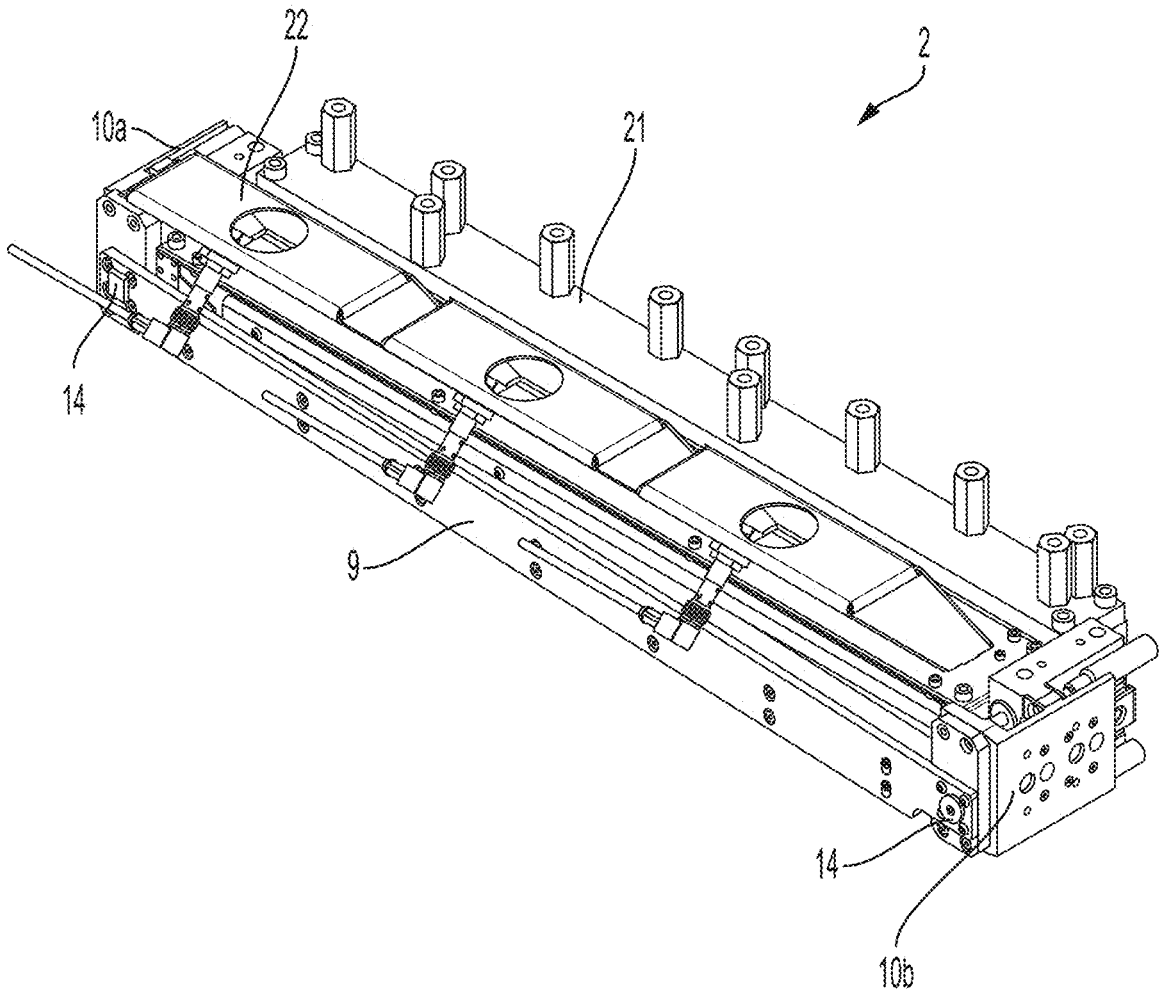
FIG. 9A is an upper, front right perspective view of the powder hopper of FIG. 7A with the gate in a partially open position, according to some embodiments.
Figure 9B:
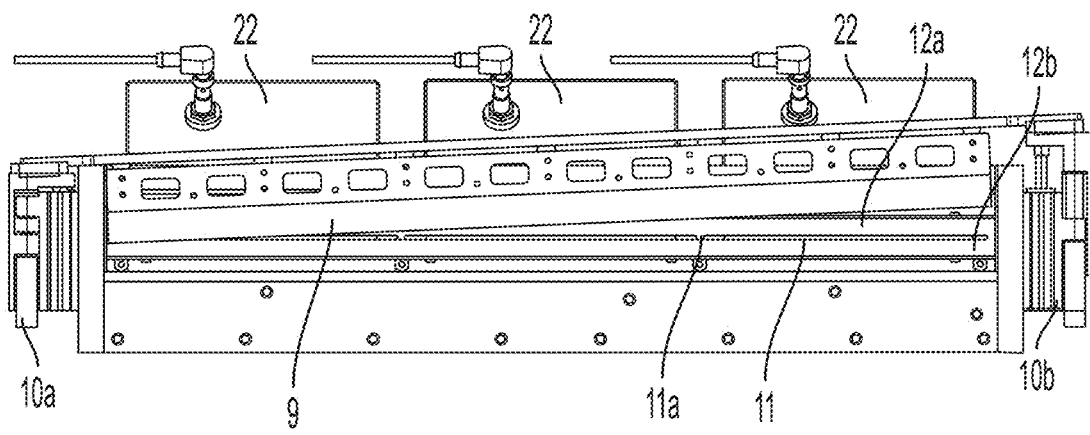
FIG. 9B is a bottom view of the powder hopper of FIG. 7A with the gate in a partially open position.
Figure 9C:
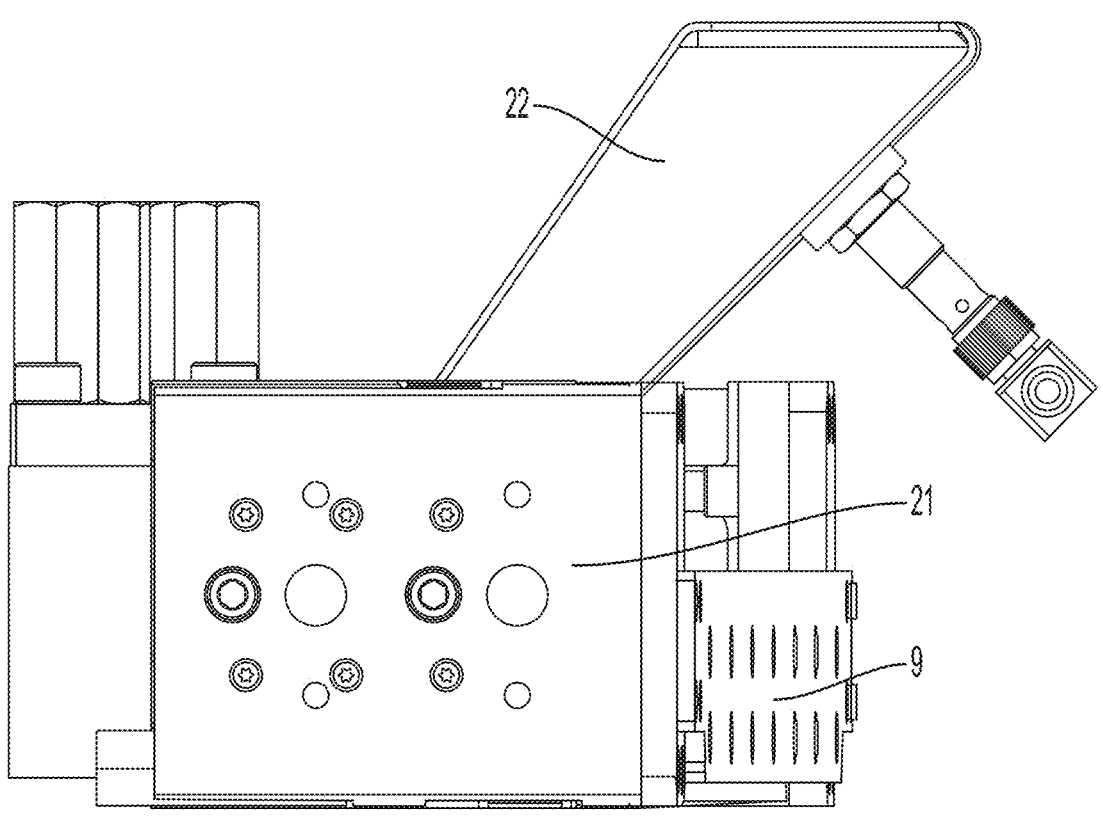
FIG. 9C is a left side view of the powder hopper of FIG. 7A with the gate in the partially open position.

In some embodiments, a powder hopper may include a gate that has a portion that contacts the hopper body and is elastically deformed in the closed position. For example, a lower portion or other part of the gate may contact the hopper body 21, e.g., at the forward and/or rear surfaces 12a, 12b near the discharge slot 11 when in the closed position. To ease manufacturing tolerances and/or help better ensure the discharge slot 11 is closed by the gate 9, the portion of the gate may elastically deform when contacting the hopper body in the closed position. Thus, the gate 9 may move toward the closed position, contact the hopper body at or near the discharge slot 11 and deform elastically with contact with the hopper body 21, e.g., so the gate portion is resiliently biased into contact with a part of the hopper body 21 near the discharge slot 11. A possible embodiment of a hopper 2 that incorporates this feature is shown in FIGS. 7A-9C, where a part of the gate 9 is elastically deformed at the closed position. The FIGS. 7A-9C embodiment is largely identical to that in FIGS. 2A-2C with the primary difference being that the lower portion 9c of the gate 9 is configured differently. In FIGS. 2A-2C, the lower portion 9c is configured so as to be relatively inflexible and stiff, and closes the discharge slot 11 by being positioned suitably close, or possibly in contact with the forward and rear surfaces 12a, 12b. However, as shown in FIG. 7C, the lower portion 9c of the gate 9 includes an elastic element, such as a thin sheet of spring steel, that covers the discharge slot 11 in the closed position of the gate 9. In some cases, the forward and rear surfaces 12a 12b of the hopper body 21 near the discharge slot 11 may be angled, e.g., to help ensure contact of the lower portion 9c with the forward and/or rear surfaces 12a, 12b when the gate moves to the closed position. For example, as can be seen in FIGS. 7C and 8C, the forward and rear surfaces 12a, 12b can be angled or sloped downwardly and away from the gate 9 in the open position. In some cases, the forward and rear surfaces 12a, 12b may lie in a common plane. However, in some embodiments, the forward and rear surfaces 12a, 12b may be arranged in different planes and/or at different angles relative to the movement of the gate, e.g., the rear surface 12b may be sloped or tilted downwardly at a greater angle than the forward surface 12a. As the gate 9 moves to the closed position, the lower portion 9c may come into contact with the forward surface 12a, which may deflect the lower portion 9c downwardly and guide the lower portion 9c toward the rear surface 12b. In some cases, the angle of the forward and rear surfaces 12a, 12b may deflect and guide the lower portion 9c to help prevent the leading edge of the lower portion 9c from engaging with an edge of the discharge slot 11. In some embodiments, the discharge slot 11 may include bridge portions 11a (see FIG. 8B) that span across the discharge slot 11 in a direction perpendicular to the length of the discharge slot. These bridge portions 11a may be provided at intervals along the length of the discharge slot 11 and help prevent the lower portion 9c from catching on an edge of the discharge slot 11 when moving to the closed position. The lower portion 9c of the gate may be in contact with the forward and/or rear surface 12a, 12b while the gate is in a closed position, and may deflect downwards if the surfaces 12a, 12b are angled downwards. In some embodiments, the forward and/or rear surfaces 12a, 12b may be ridged to further prevent the lower portion 9c of the gate from entering the discharge slot 11. For example, the ridges may extend in a direction parallel to the direction the gate moves relative to the discharge slot 11 to the closed position and deflect the lower portion 9c downwards and away from the discharge slot 11. Note as well that the hopper in FIGS. 7A-9C can incorporate the feature that the gate can pivot about a pivot axis that is transverse to the direction in which the gate moves between open and closed positions, e.g., as shown in FIGS. 9A-9C. However, this is not required, and the gate need not be configured for pivotal movement.

Figure 10A:
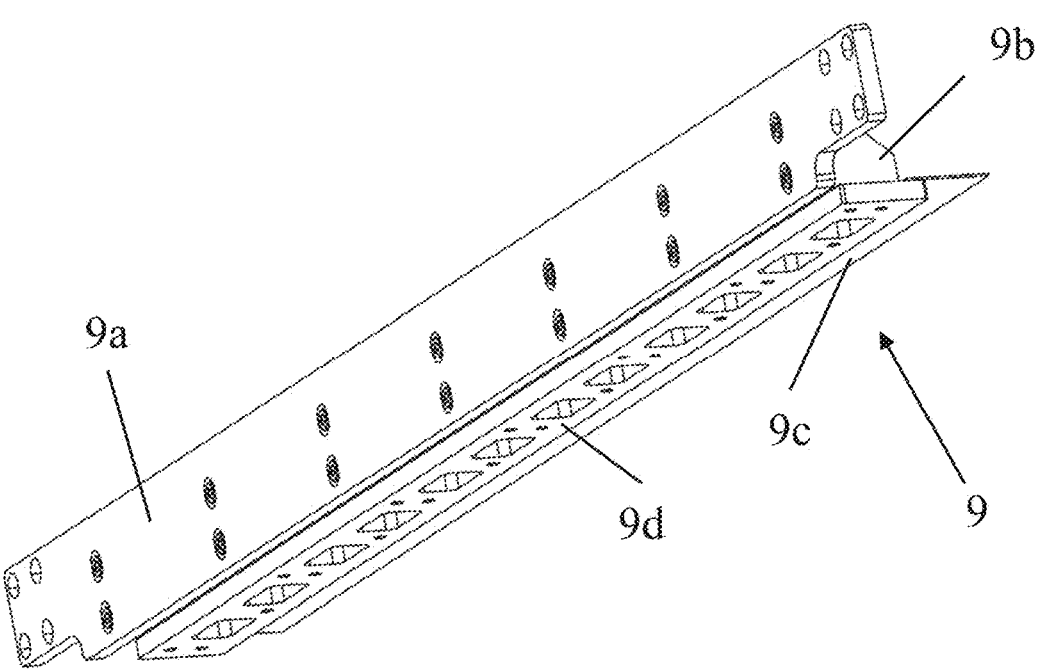
FIG. 10A is a lower, front right perspective view of the gate of the powder hopper of FIG. 7A.
Figure 10B:
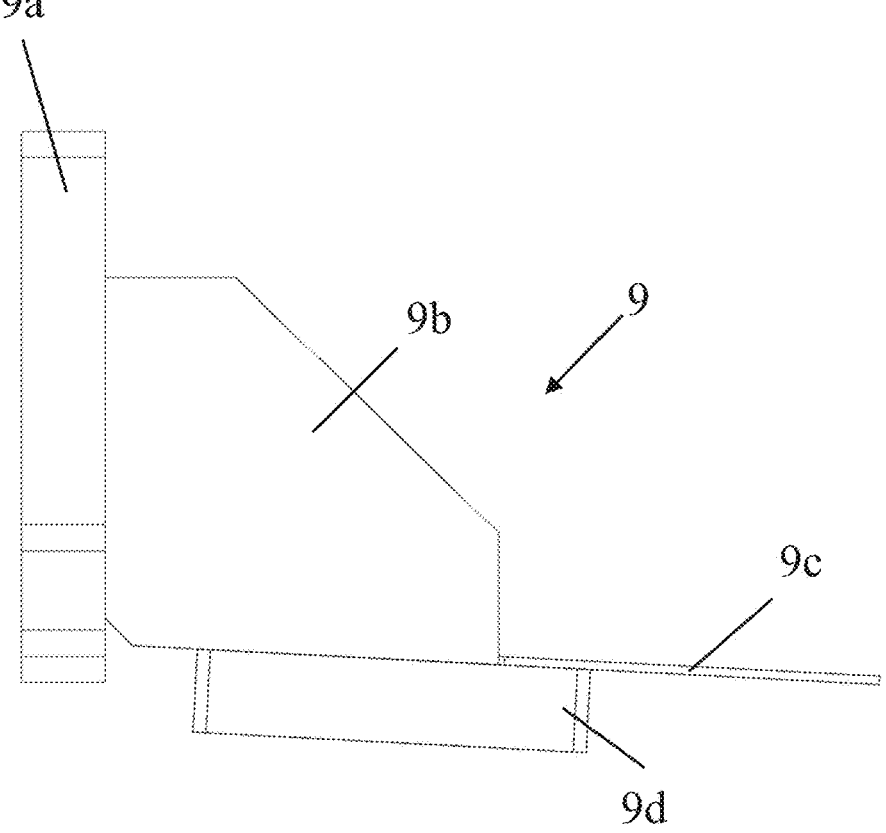
FIG. 10B is a right side view of the gate of FIG. 10A.
Figure 10C:
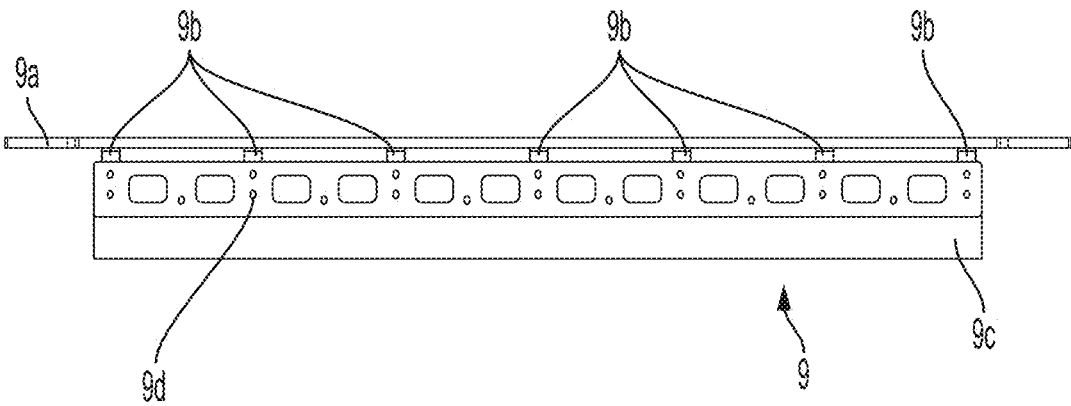
FIG. 10C is a bottom view of the gate of FIG. 10A.
Figure 10D:
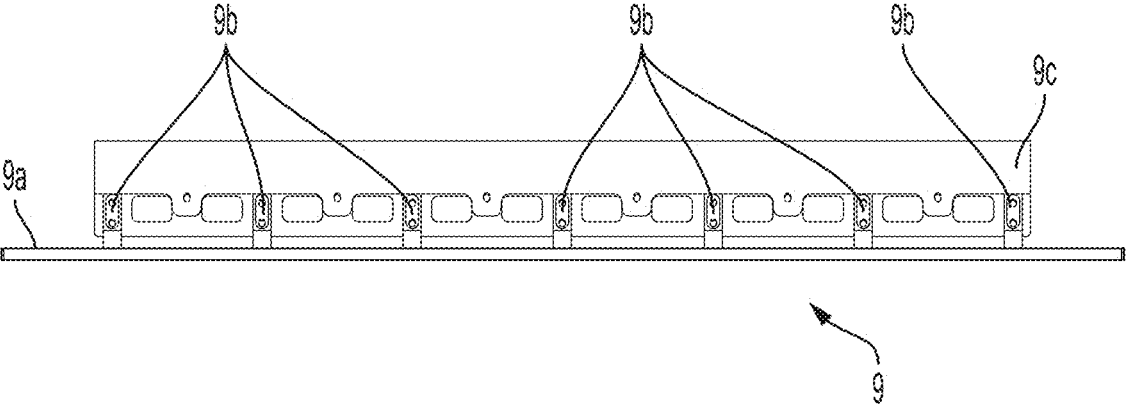
FIG. 10D is a top view of the gate of FIG. 10A.
Figure 11:
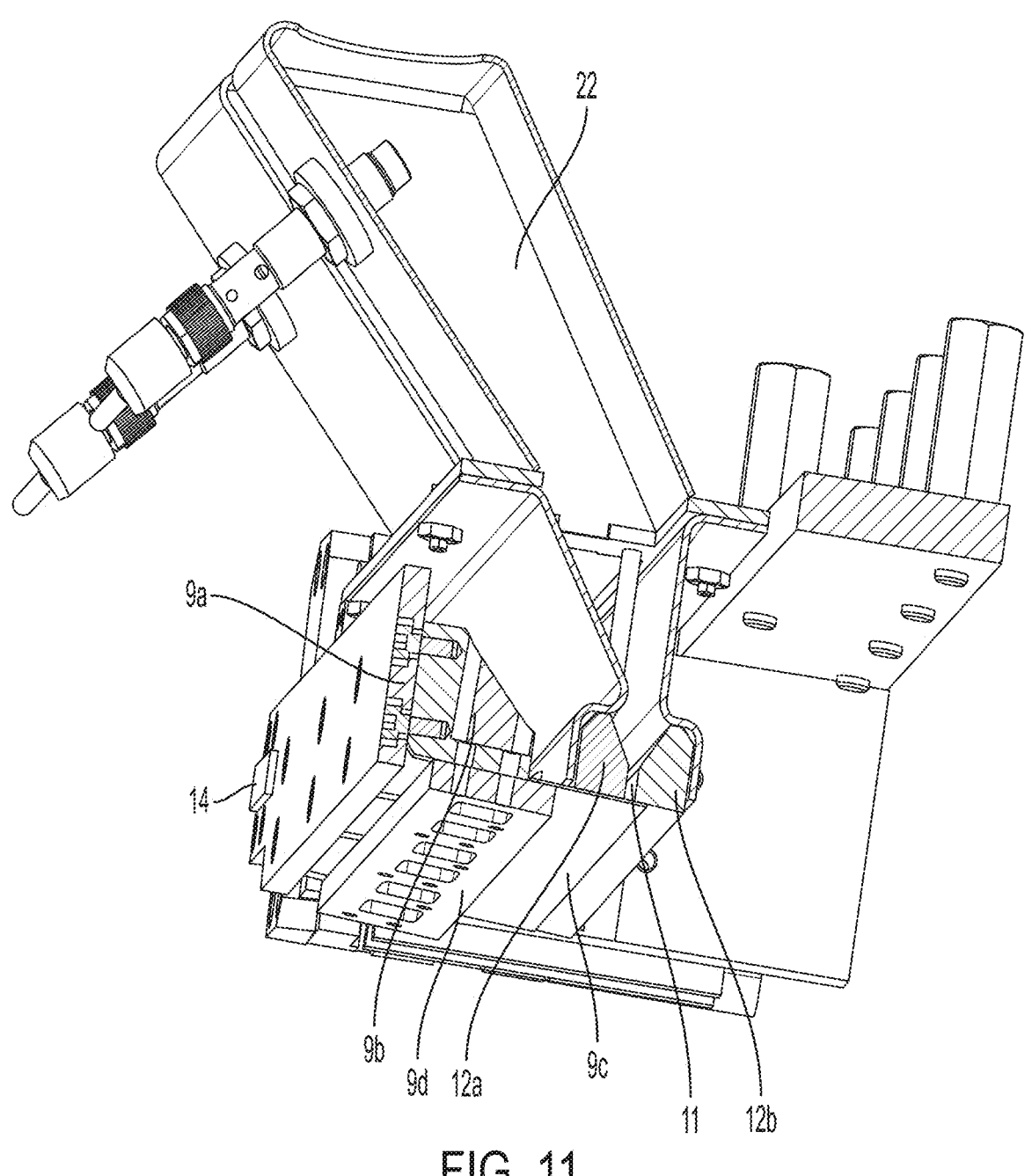
FIG. 11 is a lower, front right cross-sectional perspective view of the powder hopper of FIG. 7A with the gate in the closed position, according to some embodiments.

FIGS. 10A-10D show an embodiment of the gate in FIGS. 7A-9C. In some cases, the gate 9 can include four pieces including an upper portion 9a, brackets 9b, a lower portion 9c, and a support portion 9d. The lower portion 9c may be made of an elastically deformable material, such as a spring steel sheet, and may be mounted to the brackets 9b and the upper portion 9a by a support portion 9d. The support portion 9d may be employed to help keep the lower portion 9c relatively flat, e.g., so the lower portion 9c can uniformly contact the lower forward and rear surfaces 12a, 12b of the hopper body 21 around the discharge slot 11. As can be seen in FIG. 10B, the gate 9 can have an L-shape in side view although the lower portion 9c and the upper portion 9a need not be perpendicular to each other. Instead, an angle between the upper portion 9a and the lower portion 9c may be greater than 90 degrees and may help the lower portion 9c properly contact the lower forward and rear surfaces 12a, 12b of the hopper body 21. In some cases, the lower portion 9c may be arranged at an angle that is approximately equal to a slope or tilt angle at which the forward and rear surfaces 12a, 12b are oriented. However, as shown in FIG. 11, the forward and rear surfaces 12a, 12b need not be sloped or tilted relative to the direction of travel of the gate, but rather may be parallel to the movement direction of the gate between the open and closed positions. When in the open position, the lower portion 9c may be out of contact with the hopper body 21, and the lower portion 9c may contact the hopper body, e.g., at the forward and/or rear surfaces 12a, 12b as the gate moves to the closed position.

A gate having an elastically deformable portion may include multiple pieces, e.g., as seen in FIGS. 10A-10D, or may be made as a single piece. In some embodiments, the lower portion 9c or any other elastically deformable part of the gate may be made of any suitable material of any thickness, such as metal, composite materials, rubber, or polymers. A gate may be composed of solely elastic materials, solely inelastic materials, or any combination of elastic or inelastic materials. An elastic deformation of a portion of the gate may occur in any part of the hopper gate, not necessarily only at the lower portion 9c. For example, the upper portion 9a may elastically deform as the lower portion 9c contacts the hopper body, such as elastically deforming to accommodate for a stiff lower portion 9c deflecting downwards. In some embodiments, the lower portion 9c may be rigid and inflexible and may be connected to other parts of the gate 9 by at least one of springs, resilient spacers or other elements, e.g., located between the upper portion 9a and the lower portion 9c. The springs or other resilient elements may be compressed or otherwise elastically deformed when the gate is in a closed position, e.g., with contact of the lower portion 9c with the hopper body 21. For example, if a stiff, inelastic lower portion 9c is connected to an upper portion 9a through resilient elements such as springs, the springs may be compressed as the leading edge of the lower portion 9c deflects downwards when the gate 9 is in the closed position, and causes and opposing force to press upwards against the springs. In some embodiments, a resilient component may be located at a leading edge or front part of the lower portion 9c. The resilient component may elastically deform as the gate moves to the closed position, e.g. the leading edge of the lower portion 9c contacts a front and/or rear surface 12a, 12b.

Figure 12:
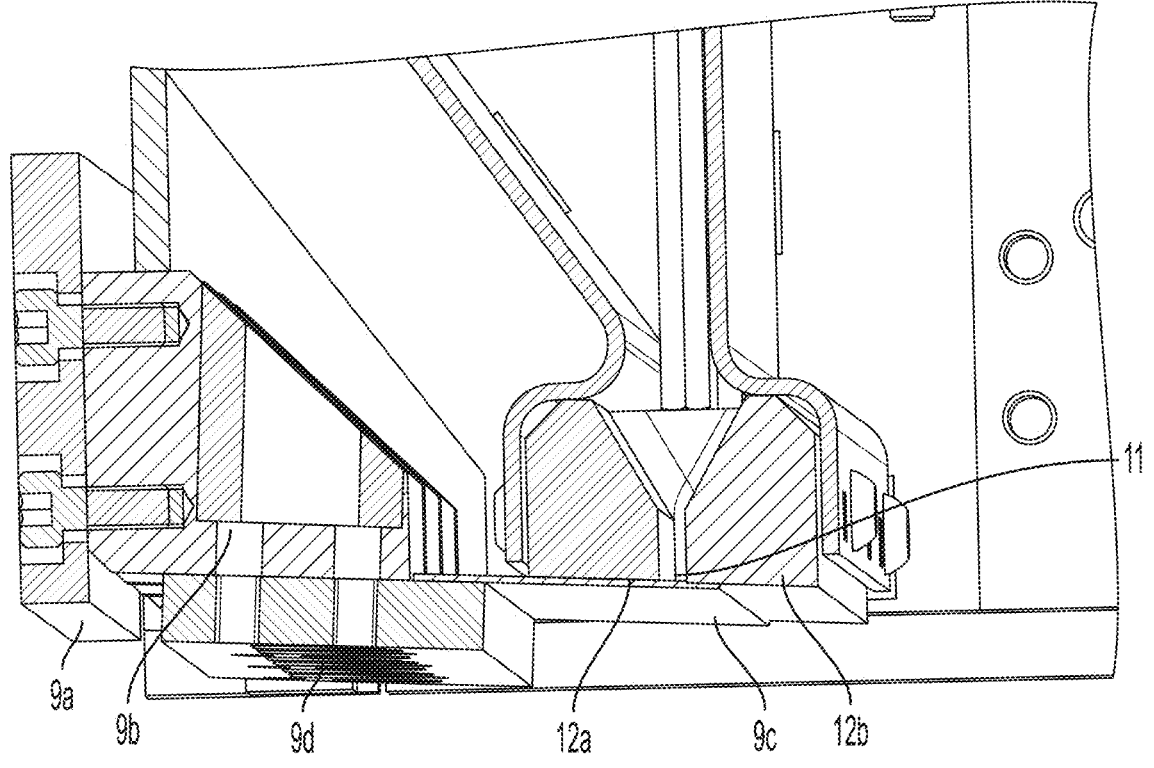
FIG. 12 is a lower, front right close up perspective view of a cross-section of the discharge slot and gate of a powder hopper with the gate in a closed position.
Figure 13:
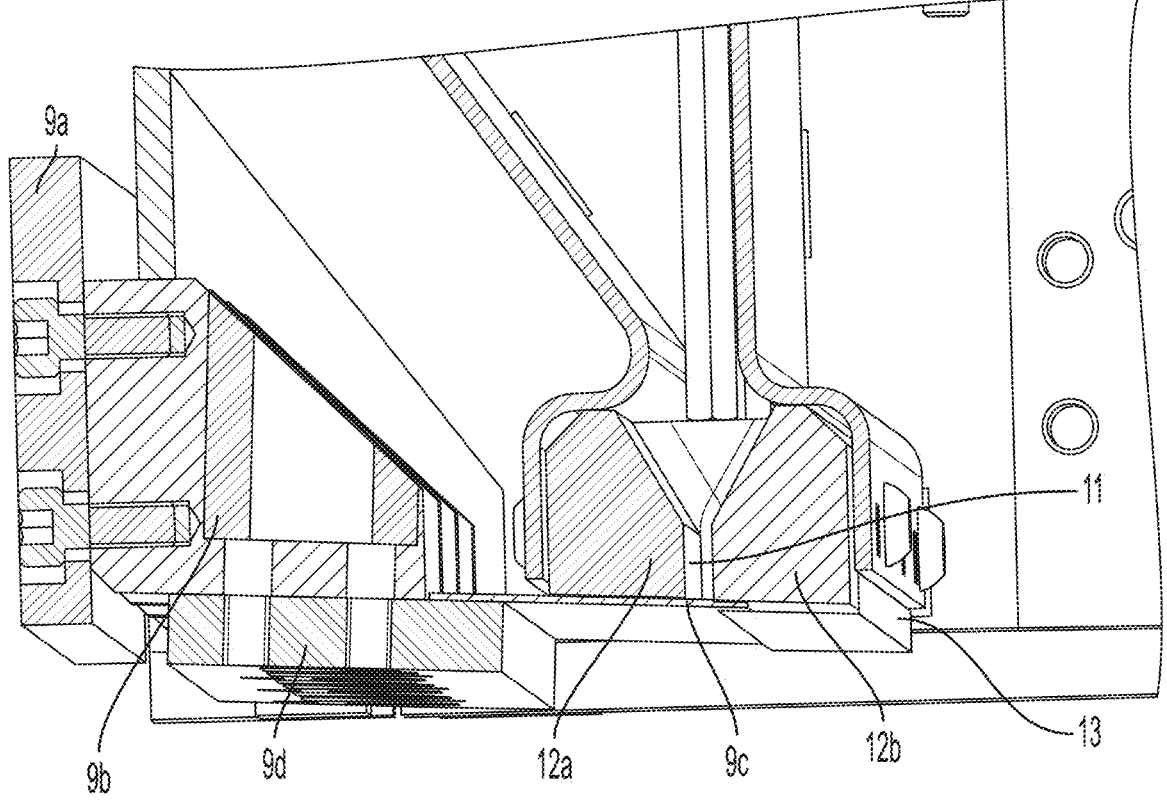
FIG. 13 is a lower, front right close up perspective view of a cross-section of the discharge slot and gate of a powder hopper with the gate in a closed position with a L-shaped bracket to receive a portion of the gate.

A close-up view of the area around the discharge slot 11 in the embodiment of FIGS. 7A-9C can be seen in FIG. 12. As the gate 9 moves to the closed position, a leading edge of the lower portion 9c may contact the forward surface 12a and deflect the lower portion 9c downwardly. This deflection may cause elastic deformation of at least a part of the lower portion 9c and/or of components that support the lower portion 9c on the gate 9, such as support portion 9d or brackets 9b. The leading edge of the lower portion 9c may continue sliding movement along the forward surface 12a until the leading edge reaches the discharge slot 11. Bridge portions 11a (not shown in FIG. 12) may be contacted by the leading edge and help prevent the leading edge from hanging up on the discharge slot 11. The leading edge may continue sliding movement across the rear surface 12b until the gate reaches the closed position. At this point, the lower portion 9c may cover the discharge slot 11 to prevent powder from exiting. The lower portion 9c may be in full pressing contact with the forward and/or rear surfaces 12a, 12b, or may contact only parts of one or both of the surfaces when the gate is in the closed position. In some embodiments, a guide or catch may be provided to help ensure that the lower portion 9c is in proper contact with the hopper body 21 when the gate is in the closed position. For example, a fixture may be provided at the rear surface 12b to receive a leading edge of the lower portion 9c. An embodiment of one such fixture is shown in FIG. 13, where a guide or catch 13 is configured to receive a leading end of the lower portion 9c of the gate in the closed position. In some cases, the guide or catch 13 can be arranged as an L-shaped bracket mounted to the hopper body 21. The guide or catch 13 may hold the lower portion 9c in place to prevent any over-deflection of the gate and/or ensure the lower portion 9c suitably contacts the hopper body 21. In some cases, the guide or catch 13 may hold the gate in place such that the weight of powder in the hopper 2 does not force the lower portion 9c away from the discharge slot 11 and cause leakage of the powder material. Thus, the lower portion 9c may have a first side (an upper side) that contacts a surface of the hopper body at the closed position, and the guide or catch 13 may contact a second side of the lower portion 9c (a lower side) to help hold the lower portion 9c in contact with the hopper body 21.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method for additive manufacturing, the method comprising:
  holding powder material within a hopper body;
  moving a gate relative to the hopper body along a first direction;
  pivoting the gate about a pivot axis that is transverse to the first direction;
  dispensing the powder material from the hopper body; and
  fusing one or more portions of one or more layers of the powder material with one or more laser energy pixels to form one or more parts on a build surface.

2. The method of claim 1, wherein dispensing the powder material from the hopper body includes dispensing the powder material in a vertical direction, and wherein the first direction is along a horizontal direction.

3. The method of claim 1, wherein the pivot axis is perpendicular to the first direction.

4. The method of claim 1, wherein the gate includes first and second ends, the hopper body further comprising first and second actuators coupled between the hopper body and the first and second ends, respectively, of the gate.

5. The method of claim 4, further comprising moving first and second ends of the gate using the first and second actuators along the first direction.

6. The method of claim 5, further comprising using the first and second actuators to move the first and second ends relative to each other to pivot the gate about the pivot axis.

7. The method of claim 6, further comprising engaging the first and second actuators at first and second locations on the gate that are spaced apart, and moving the gate along the first direction and pivoting the gate about the pivot axis using the first and second actuators.

8. The method of claim 7, further comprising providing a coupling between at least one of the first and second actuators and the gate, and permitting rotations of a portion of the gate relative to at least one of the first and second actuators about the pivot axis.

9. The method of claim 1, further comprising moving the gate in a second direction to close a discharge slot of the hopper body, wherein moving the gate in the first direction opens the discharge slot.

10. The method of claim 9, wherein a living hinge defines the pivot axis.

11. A part manufactured using the method of claim 1.

12. The method of claim 1, wherein the powder material is a metal powder material.

13. The method of claim 9, further comprising receiving a leading end of the gate in a catch.

14. A method for additive manufacturing, the method comprising:
  holding powder material within a hopper body;
  moving a gate relative to the hopper body along a first direction;
  pivoting the gate about a pivot axis that is transverse to the first direction; and
  dispensing the powder material from the hopper body, wherein dispensing the powder material from the hopper body includes dispensing the powder material in a vertical direction, and wherein the first direction is transverse to the vertical direction and the pivot axis is parallel to the vertical direction.

15. A method for additive manufacturing, the method comprising:
  holding powder material in a hopper body;
  dispensing the powder material through a discharge slot;
  moving a gate relative to the hopper body along a first direction between open and closed positions to open and close the discharge slot, respectively;
  contacting a portion of the gate with the hopper body, and elastically deforming the portion of the gate in the closed position; and
  fusing one or more portions of one or more layers of the powder material with one or more laser energy pixels to form one or more parts on a build surface.

16. The method of claim 15, further comprising contacting a bottom surface of the hopper body where the discharge slot is located, and wherein elastically deforming the portion of the gate includes elastically deforming the portion of the gate downwardly with contact with the bottom surface.

17. The method of claim 15, further comprising providing a bottom surface of the hopper body where the discharge slot is located at a slope downwardly and away from the gate in the open position.

18. The method of claim 15, further comprising providing a surface of the hopper body where the discharge slot is located such that a leading edge of the gate contacts the surface and is deformed elastically when the gate moves from the open position to the closed position.

19. The method of claim 15, further comprising moving the gate out of contact with the hopper body in the open position.

20. A part manufactured using the method of claim 15.

21. The method of claim 15, wherein the powder material is a metal powder material.

22. The method of claim 15, further comprising receiving a leading end of the gate in a catch.

23. The method of claim 15, wherein moving the gate towards the closed position elastically deforms the portion of the gate.

24. A method for additive manufacturing, the method comprising:
  holding powder material within a hopper body;
  moving a gate relative to the hopper body along a first direction;
  pivoting the gate about a pivot axis that is transverse to the first direction;
  dispensing the powder material from the hopper body; and
  fusing one or more portions of one or more layers of the powder material with one or more laser energy pixels to form one or more parts on a build surface, wherein dispensing the powder material from the hopper body includes dispensing the powder material in a vertical direction, and wherein the first direction is transverse to the vertical direction and the pivot axis is parallel to the vertical direction.

25. The method of claim 24, further comprising using first and second actuators to move first and second ends of the gate relative to each other to pivot the gate about the pivot axis and moving the gate along the first direction and pivoting the gate about the pivot axis using the first and second actuators.

26. The method of claim 25, further comprising providing a coupling between at least one of the first and second actuators and the gate, and permitting rotations of a portion of the gate relative to at least one of the first and second actuators about the pivot axis.

27. A method for additive manufacturing, the method comprising:

holding powder material in a hopper body;

dispensing the powder material through a discharge slot;

moving a gate relative to the hopper body along a first direction between open and closed positions to open and close the discharge slot, respectively;

contacting a portion of the gate with the hopper body;

elastically deforming the portion of the gate as the gate moves from the open position to the closed position; and fusing one or more portions of one or more layers of the powder material with one or more laser energy pixels to form one or more parts on a build surface.

28. The method of claim 27, further comprising contacting a bottom surface of the hopper body where the discharge slot is located, and wherein elastically deforming the portion of the gate includes elastically deforming the portion of the gate downwardly with contact with the bottom surface.

29. The method of claim 27, further comprising providing a surface of the hopper body where the discharge slot is located such that a leading edge of the gate contacts the surface and is deformed elastically when the gate moves from the open position to the closed position.

* * * * *